United States Patent
Chakraborty et al.

(10) Patent No.: US 11,259,327 B2
(45) Date of Patent: Feb. 22, 2022

(54) LISTEN-BEFORE-TALK OPERATION IN AN UNLICENSED DOWNLINK AND LICENSED UPLINK DEPLOYMENT

(71) Applicant: QUALCOMM Incorporated, San Diego, CA (US)

(72) Inventors: Kaushik Chakraborty, San Diego, CA (US); Xiaoxia Zhang, San Diego, CA (US); Jing Sun, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 16/384,732

(22) Filed: Apr. 15, 2019

(65) Prior Publication Data

US 2019/0335504 A1    Oct. 31, 2019

Related U.S. Application Data

(60) Provisional application No. 62/663,783, filed on Apr. 27, 2018.

(51) Int. Cl.
*H04W 74/08* (2009.01)
*H04W 16/14* (2009.01)

(52) U.S. Cl.
CPC ....... *H04W 74/0816* (2013.01); *H04W 16/14* (2013.01)

(58) Field of Classification Search
CPC . H04W 74/004; H04W 74/0808–0858; H04W 16/14–16
See application file for complete search history.

(56) References Cited

U.S. PATENT DOCUMENTS

| 2015/0312793 A1 | 10/2015 | Jeon et al. |
| 2016/0227571 A1* | 8/2016 | Baek ............ H04W 48/20 |

(Continued)

FOREIGN PATENT DOCUMENTS

| EP | 3131356 A1 | 2/2017 |
| WO | WO-2016046626 A1 | 3/2016 |
| WO | WO-2018022330 A1 | 2/2018 |

OTHER PUBLICATIONS

Partial International Search Report—PCT/US2019/027740—ISA/EPO—dated Jun. 13, 2019.

(Continued)

*Primary Examiner* — Eric Myers
(74) *Attorney, Agent, or Firm* — Holland & Hart, LLP

(57) ABSTRACT

Methods, systems, and devices for wireless communications are described. In systems supporting unlicensed downlink and licensed uplink communications, transmitter-based and/or receiver-based listen-before-talk may be implemented. In a transmitter-based scheme, a base station performs listen-before-talk on a downlink unlicensed band to monitor for signals from other base stations. In a first receiver-based scheme, a user equipment may send a clear to send signal on the licensed uplink channel or unlicensed downlink channel to assist a listen-before-talk operation at a serving base station. In a second receiver-based scheme, the user equipment monitors for downlink preamble transmissions from base stations other than a serving base station and reports detected preambles to the serving base station. The base station may schedule the user equipment based on the reported preambles. In some cases, the serving base station may signal other base stations to back off and reduce interference on the unlicensed downlink spectrum.

18 Claims, 19 Drawing Sheets

(56) References Cited

U.S. PATENT DOCUMENTS

2016/0227578 A1\* 8/2016 Lee ................... H04W 74/0816
2017/0208627 A1 7/2017 You et al.

OTHER PUBLICATIONS

International Search Report and Written Opinion—PCT/US2019/027740—ISA/EPO—dated Aug. 8, 2019.

\* cited by examiner

LISTEN-BEFORE-TALK OPERATION IN AN UNLICENSED DOWNLINK AND LICENSED UPLINK DEPLOYMENT

CROSS REFERENCES

The present Application for Patent claims the benefit of U.S. Provisional Patent Application No. 62/663,783 by Chakraborty, et al., entitled "LBT Operation with Unlicensed DL and Licensed UL Deployment Scenario," filed Apr. 27, 2018, assigned to the assignee hereof, and expressly incorporated herein.

BACKGROUND

The following relates generally to channel access mechanisms (e.g., listen-before-talk (LBT)) in a shared or unlicensed spectrum where a base station (e.g., node) listens to the shared medium for ongoing activity before transmitting over the medium.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

SUMMARY

The present disclosure relates to methods, systems, devices, and apparatuses for gaining access to a channel of a shared spectrum. The methods, systems, devices, and apparatuses may be implemented by a base station, a user equipment (UE), or a combination thereof. For example, a method implemented by a base station may include receiving, from a UE on a licensed uplink carrier, a signal to assist with a listen-before-talk (LBT) operation for an unlicensed downlink carrier and performing the LBT operation for the unlicensed downlink carrier, where the performing the LBT operation includes modifying the LBT operation for the unlicensed downlink carrier based on the receiving the signal to assist with the LBT operation.

An apparatus for gaining access to a channel of a shared spectrum implemented by a base station is described. The apparatus may include a processor, memory in electronic communication with the processor, and instructions stored in the memory. The instructions may be executable by the processor to cause the apparatus to receive, from a UE on a licensed uplink carrier, a signal to assist with an LBT operation for an unlicensed downlink carrier and perform the LBT operation for the unlicensed downlink carrier, where the performing the LBT operation includes modifying the LBT operation for the unlicensed downlink carrier based on the receiving the signal to assist with the LBT operation.

Another apparatus for gaining access to a channel of a shared spectrum implemented by a base station is described. The apparatus may include means for receiving, from a UE on a licensed uplink carrier, a signal to assist with an LBT operation for an unlicensed downlink carrier and means for performing the LBT operation for the unlicensed downlink carrier, where the performing the LBT operation includes modifying the LBT operation for the unlicensed downlink carrier based on the receiving the signal to assist with the LBT operation.

A non-transitory computer-readable medium storing code for gaining access to a channel of a shared spectrum implemented by a base station is described. The code may include instructions executable by a processor to receive, from a UE on a licensed uplink carrier, a signal to assist with an LBT operation for an unlicensed downlink carrier and perform the LBT operation for the unlicensed downlink carrier, where the performing the LBT operation includes modifying the LBT operation for the unlicensed downlink carrier based on the receiving the signal to assist with the LBT operation.

In some aspects of the method, apparatuses, and non-transitory computer-readable medium described herein, the modifying the LBT operation for the unlicensed downlink carrier may include operations, features, means, or instructions for refraining from transmitting on the unlicensed downlink carrier for a time duration based on the receiving the signal to assist with the LBT operation.

In some aspects of the method, apparatuses, and non-transitory computer-readable medium described herein, the signal to assist with the LBT operation may be a clear to send (CTS) signal.

Some aspects of the method, apparatuses, and non-transitory computer-readable medium described herein may further include operations, features, means, or instructions for transmitting, to the UE on the unlicensed downlink carrier, a first request to send (RTS) signal and determining that the CTS signal corresponds to a second RTS signal associated with a different base station, where the modifying the LBT operation may be based on the determining.

Some aspects of the method, apparatuses, and non-transitory computer-readable medium described herein may further include operations, features, means, or instructions for receiving, from the UE on the unlicensed downlink carrier, an additional signal to assist with an additional LBT operation for the unlicensed downlink carrier.

Some aspects of the method, apparatuses, and non-transitory computer-readable medium described herein may further include operations, features, means, or instructions for transmitting, to the UE on the unlicensed downlink carrier, a channel state information (CSI) reference signal (RS) and receiving, from the UE on the licensed uplink carrier, a CSI report in response to the CSI-RS.

Some aspects of the method, apparatuses, and non-transitory computer-readable medium described herein may further include operations, features, means, or instructions for receiving, from the UE on the unlicensed downlink carrier, a sounding reference signal (SRS) and determining CSI for the unlicensed downlink carrier based on the SRS.

In some aspects of the method, apparatuses, and non-transitory computer-readable medium described herein, the licensed uplink carrier may correspond to a licensed uplink spectrum for a different base station than the base station. In some aspects of the method, apparatuses, and non-transitory computer-readable medium described herein, downlink signals and uplink signals may be transmitted on different carriers.

A method for gaining access to a channel of a shared spectrum implemented by a UE is described. The method may include receiving, from a base station on an unlicensed downlink carrier, an RTS signal for the unlicensed downlink carrier and transmitting, to the base station on a licensed uplink carrier, a signal to assist the base station with an LBT operation for the unlicensed downlink carrier.

An apparatus for gaining access to a channel of a shared spectrum implemented by a UE is described. The apparatus may include a processor, memory in electronic communication with the processor, and instructions stored in the memory. The instructions may be executable by the processor to cause the apparatus to receive, from a base station on an unlicensed downlink carrier, an RTS signal for the unlicensed downlink carrier and transmit, to the base station on a licensed uplink carrier, a signal to assist the base station with an LBT operation for the unlicensed downlink carrier.

Another apparatus for gaining access to a channel of a shared spectrum implemented by a UE is described. The apparatus may include means for receiving, from a base station on an unlicensed downlink carrier, an RTS signal for the unlicensed downlink carrier and transmitting, to the base station on a licensed uplink carrier, a signal to assist the base station with an LBT operation for the unlicensed downlink carrier.

A non-transitory computer-readable medium storing code for gaining access to a channel of a shared spectrum implemented by a UE is described. The code may include instructions executable by a processor to receive, from a base station on an unlicensed downlink carrier, an RTS signal for the unlicensed downlink carrier and transmit, to the base station on a licensed uplink carrier, a signal to assist the base station with an LBT operation for the unlicensed downlink carrier.

In some aspects of the method, apparatuses, and non-transitory computer-readable medium described herein, the signal to assist with the LBT operation may be a CTS signal corresponding to the RTS signal.

Some aspects of the method, apparatuses, and non-transitory computer-readable medium described herein may further include operations, features, means, or instructions for detecting a transmission on the unlicensed downlink carrier and generating the signal to assist with the LBT operation based on the detecting the transmission on the unlicensed downlink carrier. In some aspects of the method, apparatuses, and non-transitory computer-readable medium described herein, the detecting the transmission on the unlicensed downlink carrier may further include operations, features, means, or instructions for identifying an additional RTS signal from an additional base station on the unlicensed downlink carrier, a downlink preamble from the additional base station on the unlicensed downlink carrier, a downlink payload from the additional base station on the unlicensed downlink carrier, an energy level on the unlicensed downlink carrier greater than a clear channel energy threshold, or any combination thereof. Some aspects of the method, apparatuses, and non-transitory computer-readable medium described herein may further include operations, features, means, or instructions for receiving, from the base station on the unlicensed downlink carrier, a downlink transmission based on the signal to assist with the LBT operation for the unlicensed downlink carrier.

Some aspects of the method, apparatuses, and non-transitory computer-readable medium described herein may further include operations, features, means, or instructions for monitoring the unlicensed downlink carrier for downlink preamble transmissions, detecting a downlink preamble transmission by an additional base station on the unlicensed downlink carrier, and modifying the transmitting the signal to assist with the LBT operation for the unlicensed downlink carrier based on the detecting.

In some aspects of the method, apparatuses, and non-transitory computer-readable medium described herein, the transmitting the signal to assist with the LBT operation for the unlicensed downlink carrier may include operations, features, means, or instructions for selecting to transmit the signal on the licensed uplink carrier based on resource availability for the licensed uplink carrier, the unlicensed downlink carrier, or a combination thereof.

Some aspects of the method, apparatuses, and non-transitory computer-readable medium described herein may further include operations, features, means, or instructions for transmitting, to the base station on the unlicensed downlink carrier, the signal to assist with the LBT operation for the unlicensed downlink carrier.

Some aspects of the method, apparatuses, and non-transitory computer-readable medium described herein may further include operations, features, means, or instructions for transmitting, to the base station on the unlicensed downlink carrier, an SRS for implicit CSI determination.

In some aspects of the method, apparatuses, and non-transitory computer-readable medium described herein, downlink signals and uplink signals may be transmitted on different carriers.

Another method for gaining access to a channel of a shared spectrum implemented by a base station is described. The method may include receiving, from a UE, reporting of a signal detected by the UE on an unlicensed downlink carrier and scheduling a transmission to the UE on the unlicensed downlink carrier based on the reporting of the signal detected by the UE.

An apparatus for gaining access to a channel of a shared spectrum implemented by a base station is described. The apparatus may include a processor, memory in electronic communication with the processor, and instructions stored in the memory. The instructions may be executable by the processor to cause the apparatus to receive, from a UE, reporting of a signal detected by the UE on an unlicensed downlink carrier and schedule a transmission to the UE on the unlicensed downlink carrier based on the reporting of the signal detected by the UE.

Another apparatus for gaining access to a channel of a shared spectrum implemented by a base station is described. The apparatus may include means for receiving, from a UE, reporting of a signal detected by the UE on an unlicensed downlink carrier and scheduling a transmission to the UE on the unlicensed downlink carrier based on the reporting of the signal detected by the UE.

A non-transitory computer-readable medium storing code for gaining access to a channel of a shared spectrum implemented by a base station is described. The code may include instructions executable by a processor to receive, from a UE, reporting of a signal detected by the UE on an unlicensed downlink carrier and schedule a transmission to the UE on the unlicensed downlink carrier based on the reporting of the signal detected by the UE.

In some aspects of the method, apparatuses, and non-transitory computer-readable medium described herein, the reporting of the signal detected by the UE involves reporting of a detected preamble, a detected channel reservation signal, a detected energy level greater than a clear channel energy threshold for the unlicensed downlink carrier, or a combination thereof.

Some aspects of the method, apparatuses, and non-transitory computer-readable medium described herein may further include operations, features, means, or instructions for identifying an additional base station associated with the signal detected by the UE, where the additional base station causes interference to the UE, and signaling the additional base station, where the signaling requests the additional base station to reduce the interference to the UE based on the reporting of the signal detected by the UE.

In some aspects of the method, apparatuses, and non-transitory computer-readable medium described herein, the additional base station may be signaled using an over the air (OTA) transmission, a backhaul, or a combination thereof.

Some aspects of the method, apparatuses, and non-transitory computer-readable medium described herein may further include operations, features, means, or instructions for transmitting, to the UE on the unlicensed downlink carrier, an RTS message, where the receiving the reporting may be based on the transmitting the RTS message.

In some aspects of the method, apparatuses, and non-transitory computer-readable medium described herein, the scheduling the UE may be further based on a network allocation vector (NAV), corresponding CSI, or a combination thereof. Some aspects of the method, apparatuses, and non-transitory computer-readable medium described herein may further include operations, features, means, or instructions for receiving the NAV with the reporting of the signal detected by the UE.

In some aspects of the method, apparatuses, and non-transitory computer-readable medium described herein, the base station may be configured with a receive capability on the unlicensed downlink carrier.

Another method for gaining access to a channel of a shared spectrum implemented by a UE is described. The method may include receiving, from a first base station on an unlicensed downlink carrier, an RTS signal, detecting a signal on the unlicensed downlink carrier, reporting, to the first base station, the detected signal, and receiving, from the first base station on the unlicensed downlink carrier, a downlink transmission according to scheduling based on the reporting of the detected signal.

An apparatus for gaining access to a channel of a shared spectrum implemented by a UE is described. The apparatus may include a processor, memory in electronic communication with the processor, and instructions stored in the memory. The instructions may be executable by the processor to cause the apparatus to receive, from a first base station on an unlicensed downlink carrier, an RTS signal, detect a signal on the unlicensed downlink carrier, report, to the first base station, the detected signal, and receive, from the first base station on the unlicensed downlink carrier, a downlink transmission according to scheduling based on the reporting of the detected signal.

Another apparatus for gaining access to a channel of a shared spectrum implemented by a UE is described. The apparatus may include means for receiving, from a first base station on an unlicensed downlink carrier, an RTS signal, detecting a signal on the unlicensed downlink carrier, reporting, to the first base station, the detected signal, and receiving, from the first base station on the unlicensed downlink carrier, a downlink transmission according to scheduling based on the reporting of the detected signal.

A non-transitory computer-readable medium storing code for gaining access to a channel of a shared spectrum implemented by a UE is described. The code may include instructions executable by a processor to receive, from a first base station on an unlicensed downlink carrier, an RTS signal, detect a signal on the unlicensed downlink carrier, report, to the first base station, the detected signal, and receive, from the first base station on the unlicensed downlink carrier, a downlink transmission according to scheduling based on the reporting of the detected signal.

In some aspects of the method, apparatuses, and non-transitory computer-readable medium described herein, the detected signal is an example of a detected preamble from a second base station, a detected channel reservation signal from the second base station, a detected energy level greater than a clear channel energy threshold for the unlicensed downlink carrier, or a combination thereof.

Some aspects of the method, apparatuses, and non-transitory computer-readable medium described herein may further include operations, features, means, or instructions for monitoring the unlicensed downlink carrier based on the receiving the RTS signal, where the detecting may be based on the monitoring.

Some aspects of the method, apparatuses, and non-transitory computer-readable medium described herein may further include operations, features, means, or instructions for detecting a NAV associated with the detected signal and reporting the NAV with the detected signal.

In some aspects of the method, apparatuses, and non-transitory computer-readable medium described herein, the reporting indicates a signal strength associated with the detected signal, a signal duration associated with the detected signal, or a combination thereof.

In some aspects of the method, apparatuses, and non-transitory computer-readable medium described herein, the detected signal may be reported on the unlicensed downlink carrier, a licensed uplink carrier, or a combination thereof.

BRIEF DESCRIPTION OF THE DRAWINGS

The nature of the present disclosure may be understood by reference to the following drawings.

DETAILED DESCRIPTION

Figure 1:
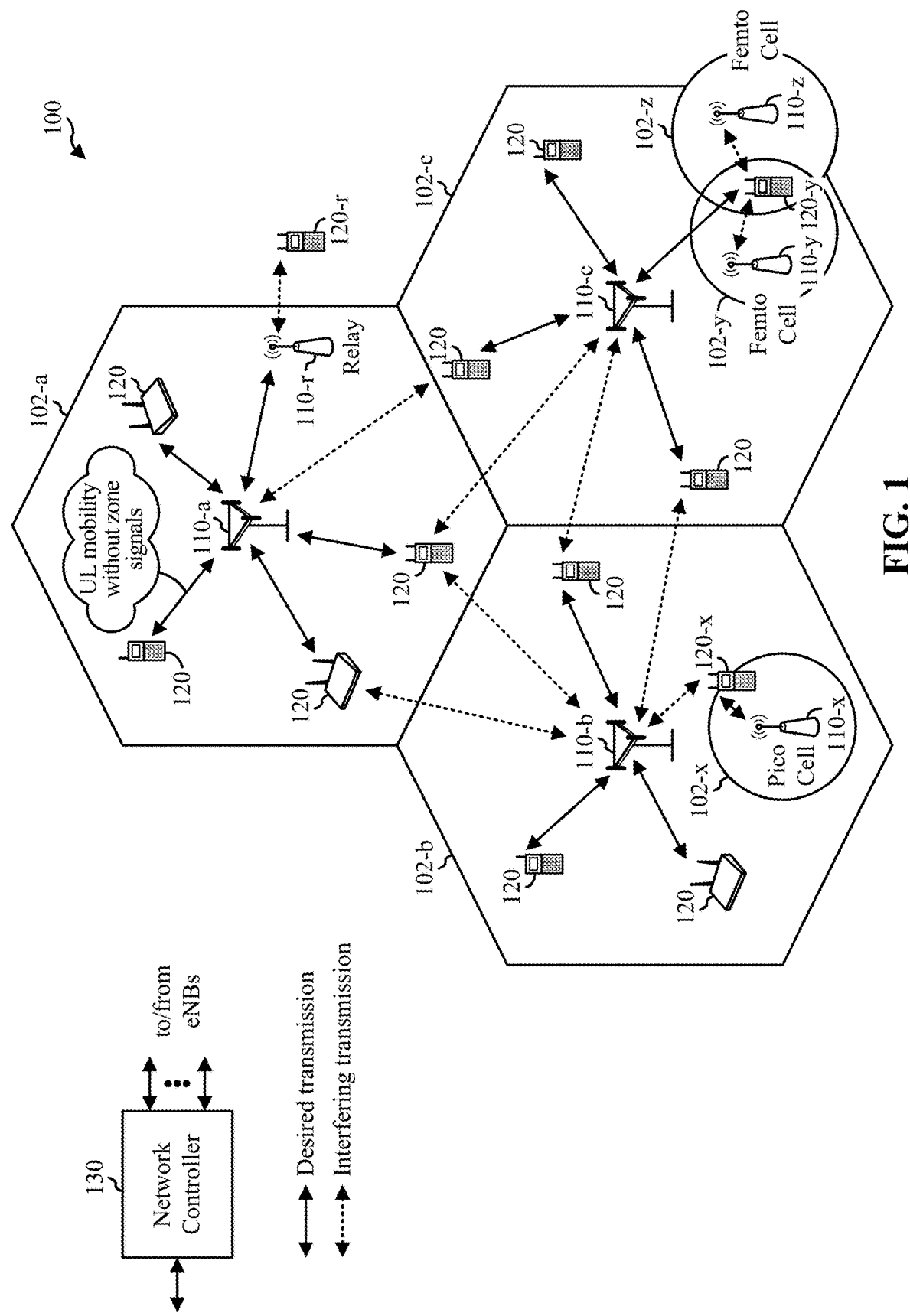
FIG. 1 illustrates an example of a wireless network that supports listen-before-talk (LBT) operation in an unlicensed downlink (DL) and licensed uplink (UL) deployment in accordance with various aspects of the present disclosure.

In some wireless communications systems, such as 5th Generation (5G) New Radio (NR) systems, transmission waveforms may include cyclic prefix orthogonal frequency division multiplexing (CP-OFDM) and discrete Fourier transform-spread (DFT-S) OFDM. 5G allows for switching between both CP-OFDM and DFT-S-OFDM on the uplink (UL) to get the multiple input multiple output (MIMO) spatial multiplexing benefit of CP-OFDM and the link budget benefit of DFT-S-OFDM. With Long Term Evolution (LTE), orthogonal frequency division multiple access (OFDMA) communication signals may be used for downlink (DL) communications, while single-carrier frequency division multiple access (SC-FDMA) communication signals may be used for LTE UL communications. The DFT-s-OFDMA scheme spreads a set of data symbols (i.e., a data symbol sequence) over a frequency domain which is different from the OFDMA scheme. Also, in comparison to the OFDMA scheme, the DFT-s-OFDMA scheme can greatly reduce the peak to average power ratio (PAPR) of a transmission signal. The DFT-s-OFDMA scheme may also be referred to as an SC-FDMA scheme.

Scalable OFDM multi-tone numerology is another feature of 5G. Prior versions of LTE supported a mostly fixed OFDM numerology of fifteen (15) kilohertz (kHz) spacing between OFDM tones (often called subcarriers) and carrier bandwidths up to twenty (20) megahertz (MHz). Scalable OFDM numerology has been introduced in 5G to support diverse spectrum bands/types and deployment models. For example, 5G NR is able to operate in millimeter wave (mmW) bands that have wider channel widths (e.g., hundreds of MHz) than bands in use in LTE. Also, the OFDM subcarrier spacing may scale with the channel width, so the fast Fourier transform (FFT) size may also scale such that the processing complexity does not increase unnecessarily for wider bandwidths. In the present application, numerology may refer to the different values that different features (e.g., subcarrier spacing, cyclic prefix (CP), symbol length, FFT size, transmission time interval (TTI), etc.) of a communication system can take.

Also in 5G NR, cellular technologies have been expanded into the unlicensed spectrum (e.g., both stand-alone and licensed-assisted access (LAA)). In addition, the unlicensed spectrum may occupy frequencies up to one hundred (100) gigahertz (GHz) or higher, also known as mmW. The use of unlicensed bands provides added capacity for communications in the system.

A first member of this technology family is referred to as LTE Unlicensed (LTE-U). By aggregating LTE in unlicensed spectrum with an 'anchor' channel in licensed spectrum, faster downloads are enabled for customers. Also, LTE-U may share the unlicensed spectrum fairly with Wi-Fi. This is an advantage because in the five (5) GHz unlicensed band where Wi-Fi devices are in wide use, it is desirable for LTE-U to coexist with Wi-Fi. However, an LTE-U network may cause radio frequency (RF) interference to an existing co-channel Wi-Fi device. Choosing a preferred operating channel and minimizing the interference caused to nearby Wi-Fi networks may be a goal for LTE-U devices. However, an LTE-U single carrier (SC) device may operate on the same channel as Wi-Fi if all available channels are occupied by Wi-Fi devices. To coordinate spectrum access between LTE-U and Wi-Fi, the energy across the intended transmission band may first be detected. This energy detection (ED) mechanism informs the device of ongoing transmissions by other nodes. Based on this ED information, a device decides if it should transmit on the intended transmission band. Wi-Fi devices may not back off for LTE-U transmissions unless the interference level caused by the LTE-U transmissions is above an ED threshold (e.g., negative sixty-two (−62) decibel-milliwatts (dBm) over 20 MHz). Thus, without proper coexistence mechanisms in place, LTE-U transmissions could cause considerable interference on a Wi-Fi network relative to Wi-Fi transmissions.

LAA is another member of the unlicensed technology family. Like LTE-U, it may also use an anchor channel in licensed spectrum. However, it also adds "listen before talk" (LBT) operations to the LTE functionality.

A gating interval may be used to gain access to a channel of a shared spectrum. The gating interval may determine the application of a contention-based protocol such as an LBT protocol. The gating interval may indicate when a clear channel assessment (CCA) is performed. Whether a channel of the shared unlicensed spectrum is available or in use is determined by the CCA. If the channel is "clear" for use, i.e., available, the gating interval may allow the transmitting apparatus to use the channel. Access to the channel is typically granted for a predefined transmission interval. Thus, with unlicensed spectrum, an LBT procedure is performed before transmitting a message. If the channel is not cleared for use, then a device will not transmit on the channel.

Another member of this family of unlicensed technologies is LTE-wireless local area network (WLAN) Aggregation (LWA), which may utilize both LTE and Wi-Fi. Accounting for both channel conditions, LWA can split a single data flow into two data flows which allows both the LTE and the Wi-Fi channel to be used for an application. Instead of competing with Wi-Fi, the LTE signal may use the WLAN connections seamlessly to increase capacity.

The final member of this family of unlicensed technologies is MulteFire. MulteFire opens up new opportunities by operating Fourth Generation (4G) LTE technology solely in unlicensed spectrum such as the global 5 GHz. Unlike LTE-U and LAA, MulteFire may support entities without any access to the licensed spectrum. Thus, it operates in unlicensed spectrum on a standalone basis (e.g., without any anchor channel in the licensed spectrum). Thus, MulteFire differs from LTE-U, LAA, and LWA because LTE-U, LAA, and LWA aggregate unlicensed spectrum with an anchor in licensed spectrum. Without relying on licensed spectrum as the anchoring service, MulteFire allows for Wi-Fi-like deployments. A MulteFire network may include access points (APs) and/or base stations communicating in an unlicensed radio frequency spectrum band (e.g., without a licensed anchor carrier).

Discovery reference signal (DRS) measurement timing configuration (DMTC) is a technique that allows MulteFire to transmit with minimal or reduced interference to other unlicensed technologies, including Wi-Fi. Additionally, the periodicity of discovery signals in MulteFire may be very sparse. This allows MulteFire to access channels occasionally, transmit discovery and control signals, and then vacate the channels. Since the unlicensed spectrum is shared with other radios of similar or dissimilar wireless technologies, a so-called LBT method may be applied for channel sensing. LBT may include sensing the medium for a pre-defined minimum amount of time and backing off if the channel is busy. Therefore, the initial random access (RA) procedure for standalone LTE-U may involve a minimal number of transmissions with low latency, such that the number of LBT operations may be minimized or reduced and the RA procedure may be completed quickly.

Leveraging a DMTC window, MulteFire algorithms may search and decode reference signals in unlicensed bands from neighboring base stations in order to find which base station to select to serve the user. As the caller moves past one base station, their user equipment (UE) may send a measurement report to the base station, triggering a handover procedure and transferring the caller (and all of their content and information) to the next base station.

Since LTE traditionally operates in licensed spectrum and Wi-Fi operates in unlicensed bands, coexistence with Wi-Fi or other unlicensed technology was not considered when LTE was designed. In moving to the unlicensed world, the LTE waveform was modified and algorithms were added in order to perform LBT. This may support the ability to share a channel with unlicensed incumbents, including Wi-Fi, by not immediately acquiring the channel and transmitting. The present example supports LBT and the detection and transmission of Wi-Fi Channel Usage Beacon Signals (WCUBSs) for ensuring coexistence with Wi-Fi neighbors.

MulteFire was designed to "hear" a neighboring Wi-Fi base station's transmission. MulteFire may listen first and autonomously make the decision to transmit when there is no other neighboring Wi-Fi transmitting on the same channel (e.g., within a threshold range). This technique may ensure co-existence between MulteFire and Wi-Fi transmissions.

The Third Generation Partnership Project (3GPP) and the European Telecommunications Standards Institute (ETSI) mandate an LBT detection threshold (e.g., a negative seventy-two (−72) dBm LBT detection threshold). This threshold may further help wireless devices avoid transmitting messages that interfere with Wi-Fi. MulteFire's LBT design may be similar or identical to the standards defined in 3GPP for LAA/enhanced LAA (eLAA) and may comply with ETSI rules.

An expanded functionality for 5G involves the use of 5G NR spectrum sharing (NR-SS). 5G NR-SS may enable enhancement, expansion, and/or upgrade of the spectrum sharing technologies introduced in LTE. These include LTE Wi-Fi Aggregation (LWA), LAA, eLAA, Citizen's Broadband Radio service (CBRS)/License Shared Access (LSA), or any combination of these technologies.

In some wireless communications systems, wireless devices may support communications using an unlicensed DL carrier (e.g., an unlicensed DL band, channel, spectrum, medium, etc.) and a licensed UL carrier (e.g., a licensed UL band, channel, spectrum, medium, etc.). To reduce collisions on the unlicensed DL carrier and efficiently use the carrier resources, the wireless devices (e.g., base stations and UEs) may implement a transmitter-based LBT scheme, a receiver-based LBT scheme, or a combination thereof.

In a transmitter-based scheme, a base station performs an LBT operation on the unlicensed DL carrier to monitor for signals from other base stations. If the base station detects a signal or energy above a threshold level, the base station may determine that another base station is operating on the unlicensed DL carrier and may perform a backoff procedure.

In a receiver-based scheme, a UE may transmit information to a base station to assist the base station in determining if the channel is clear for the UE. In a first aspect, the UE may transmit a clear to send (CTS) message on the licensed UL carrier to a serving base station. Other base stations may monitor the licensed UL carrier for the serving base station. If these base stations detect the CTS, the base stations may refrain from transmitting on the unlicensed DL carrier based on the CTS message, and the serving base station may schedule a transmission of the unlicensed DL carrier based on the CTS message. The CTS message on the licensed UL carrier may implicitly or explicitly map to the unlicensed DL carrier. For example, in one aspect, the CTS message may explicitly carry identification information about the unlicensed DL carrier for which it is signaled. In another aspect, the base station may indicate to the UE (e.g., via a broadcast signal), the signaling space (e.g., time/frequency resources) of CTS messages on the licensed UL carrier that correspond to the unlicensed DL carrier.

In a second aspect, the UE may monitor for DL preamble transmissions from base stations other than a serving base station. If the UE detects a DL preamble from another base station, the UE may transmit a report to the serving base station (e.g., on the licensed UL carrier or the unlicensed DL carrier). The serving base station may back off the unlicensed DL spectrum based on the detected preamble. In some cases, the serving base station may transmit inter-base station signaling to an interfering base station, requesting for the interfering base station to back off the spectrum.

In a third aspect, the UE may monitor for DL preamble transmissions from base stations other than a serving base station and may transmit a CTS message to the serving base station if no preambles are detected (e.g., within a certain time frame). The CTS message may be transmitted in the unlicensed DL carrier.

In some cases, the wireless communications system may additionally support channel reciprocity for channel state information (CSI) reporting when a UE and base station communicate using a licensed UL carrier and an unlicensed DL carrier. For example, rather than transmitting an explicit CSI report, a UE may transmit a sounding reference signal (SRS) on the unlicensed DL carrier to the serving base station. The serving base station may use this SRS to determine CSI for the unlicensed DL carrier.

Aspects of the disclosure are initially described in the context of a wireless network. Aspects of the disclosure are then illustrated by and described with reference to apparatus diagrams, system diagrams, and flowcharts that relate to LBT operations in an unlicensed DL and licensed UL deployment.

FIG. 1 illustrates an example wireless network 100 that supports LBT operation in an unlicensed DL and licensed UL deployment in accordance with various aspects of the present disclosure. The wireless network 100 may include a number of base stations 110 and other network entities. A base station 110 may be a station that communicates with UEs 120. Each base station 110 may provide communication coverage for a particular geographic area. In 3GPP, the term "cell" may refer to a coverage area of a Node B and/or a Node B subsystem serving this coverage area, depending on the context in which the term is used. In NR systems, the term "cell" and evolved Node B (eNB), Node B, 5G NB, AP, NR base station, 5G Radio NodeB (gNB), or transmission/reception point (TRP) may be interchangeable. In some aspects, a cell may not necessarily be stationary, and the geographic area of the cell may move according to the location of a mobile base station 120. In some aspects, the base stations 110 may be interconnected to one another and/or to one or more other base stations 110 or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A base station 110 may provide communication coverage for a macro cell, a pico cell, a femto cell, and/or other types of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs in a Closed Subscriber Group (CSG), UEs for users in the home, etc.). A base station 110 for a macro cell may be referred to as a macro base station. A base station for a pico cell may be referred to as a pico base station. A base station for a femto cell may be referred to as a femto base station or a home base station. In the example shown in FIG. 1, the base stations 110-a, 110-b, and 110-c may be macro base stations for the macro cells 102-a, 102-b, and 102-c, respectively. The base station 110-x may be a pico base station for a pico cell 102-x. The base stations 110-y and 110-z may be femto base stations for the femto cells 102-y and 102-z, respectively. A base station may support one or multiple (e.g., three) cells.

The wireless network 100 may also include relay stations. A relay station is a station that receives a transmission of data and/or other information from an upstream station (e.g., a base station 110 or a UE 120) and sends a transmission of the data and/or other information to a downstream station (e.g., a UE 120 or a base station 110). A relay station may also be a UE 120 that relays transmissions for other UEs 120. In the example shown in FIG. 1, a relay station 110-r may communicate with the base station 110-a and a UE 120-r in order to facilitate communication between the base station 110-a and the UE 120-r. A relay station may also be referred to as a relay base station, a relay, etc.

The wireless network 100 may be a heterogeneous network that includes base stations 110 of different types, e.g., macro base stations, pico base stations, femto base stations, relays, etc. These different types of base stations may have different transmit power levels, different coverage areas, and may have differing impacts on interference in the wireless network 100. For example, a macro base station may have a high transmit power level (e.g., 20 Watts) whereas a pico base station, or a femto base station, or a relay may have a lower transmit power level (e.g., one (1) Watt).

The wireless network 100 may support synchronous or asynchronous operation. For synchronous operation, the base stations 110 may have similar frame timing, and transmissions from different base stations 110 may be approximately aligned in time. For asynchronous operation, the base stations 110 may have different frame timing, and transmissions from different base stations 110 may not be aligned in time. The techniques described herein may be used for both synchronous and asynchronous operation.

A network controller 130 may be coupled to a set of base stations 110 and provide coordination and control for these base stations 110. The network controller 130 may communicate with the base stations 110 via a backhaul. The base stations 110 may also communicate with one another, e.g., directly or indirectly via wireless or wireline backhaul.

The UEs 120 (e.g., 120-x, 120-y, etc.) may be dispersed throughout the wireless network 100, and each UE may be stationary or mobile. A UE 120 may also be referred to as a mobile station, a terminal, an access terminal, a subscriber unit, a station, a customer premises equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., global positioning system (GPS), Beidou, terrestrial, etc.), or any other suitable device that is configured to communicate via a wireless or wired medium.

Some UEs 120 may be considered machine-type communication (MTC) devices or evolved MTC (eMTC) devices, which may include remote devices that may communicate with a base station 110, another remote device, or some other entity. MTC may refer to communication involving at least one remote device on at least one end of the communication and may include forms of data communication which involve one or more entities that do not necessarily need human interaction. MTC UEs may include UEs 120 that are capable of MTC communications with MTC servers and/or other MTC devices through Public Land Mobile Networks (PLMNs), for example. MTC and enhanced MTC (eMTC) UEs include, for example, robots, drones, remote devices, sensors, meters, monitors, cameras, location tags, etc., that may communicate with a base station 110, another device (e.g., remote device), or some other entity. A wireless node may provide, for example, connectivity for or to a network (e.g., a wide area network such as the Internet or a cellular network) via a wired or wireless communication link. MTC UEs, as well as other UEs 120, may be implemented as Internet-of-Things (IoT) devices, e.g., narrowband IoT (NB-IoT) devices. In NB IoT, the UL and DL have higher periodicities and repetitions interval values as a UE 120 decodes data in extended coverage.

In FIG. 1, a solid line with double arrows indicates desired transmissions between a UE 120 and a serving base station, which is a base station 110 designated to serve the UE 120 on the DL and/or UL. A dashed line with double arrows indicates interfering transmissions between a UE 120 and a base station 110.

Certain wireless networks (e.g., LTE) utilize OFDM on the DL and single-carrier frequency division multiplexing (SC-FDM) on the UL. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers, K, may be dependent on the system bandwidth. For example, the spacing of the subcarriers may be 15 kHz and the minimum resource allocation (called a 'resource block') may be twelve (12) subcarriers (or one hundred eighty (180) kHz). Consequently, the nominal FFT size may be equal to one hundred and twenty-eight (128), two hundred and fifty-six (256), five hundred and twelve (512), one thousand twenty-four (1024), or two thousand forty-eight (2048) for system bandwidth of 1.25, 2.5, 5, 10 or 20 MHz, respectively. The system bandwidth may also be partitioned into subbands. For example, a subband may cover 1.08 MHz (e.g., six (6) resource blocks), and there may be 1, two (2), four (4), eight (8), or sixteen (16) subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR or other wireless communications systems. NR may utilize OFDM with a CP on the UL and DL and may include support for half-duplex operation using time division duplex (TDD). A single component carrier bandwidth of one hundred (100) MHz may be supported. NR resource blocks may span 12 subcarriers with a subcarrier bandwidth of seventy-five (75) kHz over a 0.1 milliseconds (ms) duration. Each radio frame may consist of fifty (50) subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes (e.g., for NR) may be described in more detail with respect to FIGS. 5A and 5B. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE 120. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units (CUs) and/or distributed units (DUs).

In some aspects, access to the air interface may be scheduled, where a scheduling entity (e.g., a base station 110) allocates resources for communication among some or all devices and equipment within its service area or cell. Within the present disclosure, as discussed further herein, the scheduling entity may be responsible for scheduling, assigning, reconfiguring, and releasing resources for one or more subordinate entities. That is, for scheduled communication, subordinate entities utilize resources allocated by the scheduling entity. Base stations 110 are not the sole entities that may function as a scheduling entity. That is, in some aspects, a UE 120 may function as a scheduling entity, scheduling resources for one or more subordinate entities (e.g., one or more other UEs 120). In this aspect, a first UE 120 is functioning as a scheduling entity, and other UEs 120 utilize resources scheduled by the first UE 120 for wireless communication. A UE 120 may function as a scheduling entity in a peer-to-peer (P2P) network and/or in a mesh network. In a mesh network example, UEs 120 may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As discussed herein, a radio access network (RAN) may include a CU and one or more DUs. An NR base station (e.g., eNB, 5G Node B, Node B, TRP, AP, or gNB) may correspond to one or multiple base stations 110. NR cells may be configured as access cell (ACells) or data only cells (DCells). For example, the RAN (e.g., a CU or DU) may configure the cells. DCells may be cells used for carrier aggregation or dual connectivity, but not used for initial access, cell selection/reselection, or handover. In some cases, DCells may not transmit synchronization signals (SS), and in other cases, DCells may transmit SS. NR base stations may transmit DL signals to UEs 120 indicating the cell type. Based on the cell type indication, the UE 120 may communicate with the NR base station. For example, the UE 120 may determine NR base stations to consider for cell selection, access, handover, and/or measurement based on the indicated cell type.

The wireless network 100 may support implementation of LBT operations within unlicensed DL and licensed UL deployment scenarios. In some aspects, the wireless network 100 may support a transmitter-based LBT scheme. In other aspects, the wireless network 100 may support a receiver-based LBT scheme. For example, a UE 120 may receive a request to send (RTS) signal for the unlicensed DL carrier from a base station 110 on the unlicensed DL carrier. The UE 120 may transmit, to the base station 110 on a licensed UL carrier, a signal to assist the base station 110 with an LBT operation for the unlicensed DL carrier. The base station 110 may receive the signal to assist with the LBT operation for the unlicensed DL carrier and may perform the LBT operation for the unlicensed DL carrier, where the LBT operation is modified based on receiving the signal to assist with the LBT operation. Additionally or alternatively, a UE 120 may receive, from a first base station 110 on an unlicensed DL carrier, an RTS signal and may detect, from a second base station 110 on the unlicensed DL carrier, a DL preamble. The UE 120 may report, to the first base station 110, the detected DL preamble. The base station 110 may receive the reporting of the preamble detected by the UE 120 on the unlicensed DL carrier and may schedule a transmission to the UE 120 on the unlicensed DL carrier based on the reporting of the preamble. The UE 120 may receive the downlink transmission from the base station 110 according to the scheduling based on the reported DL preamble.

Figure 2:
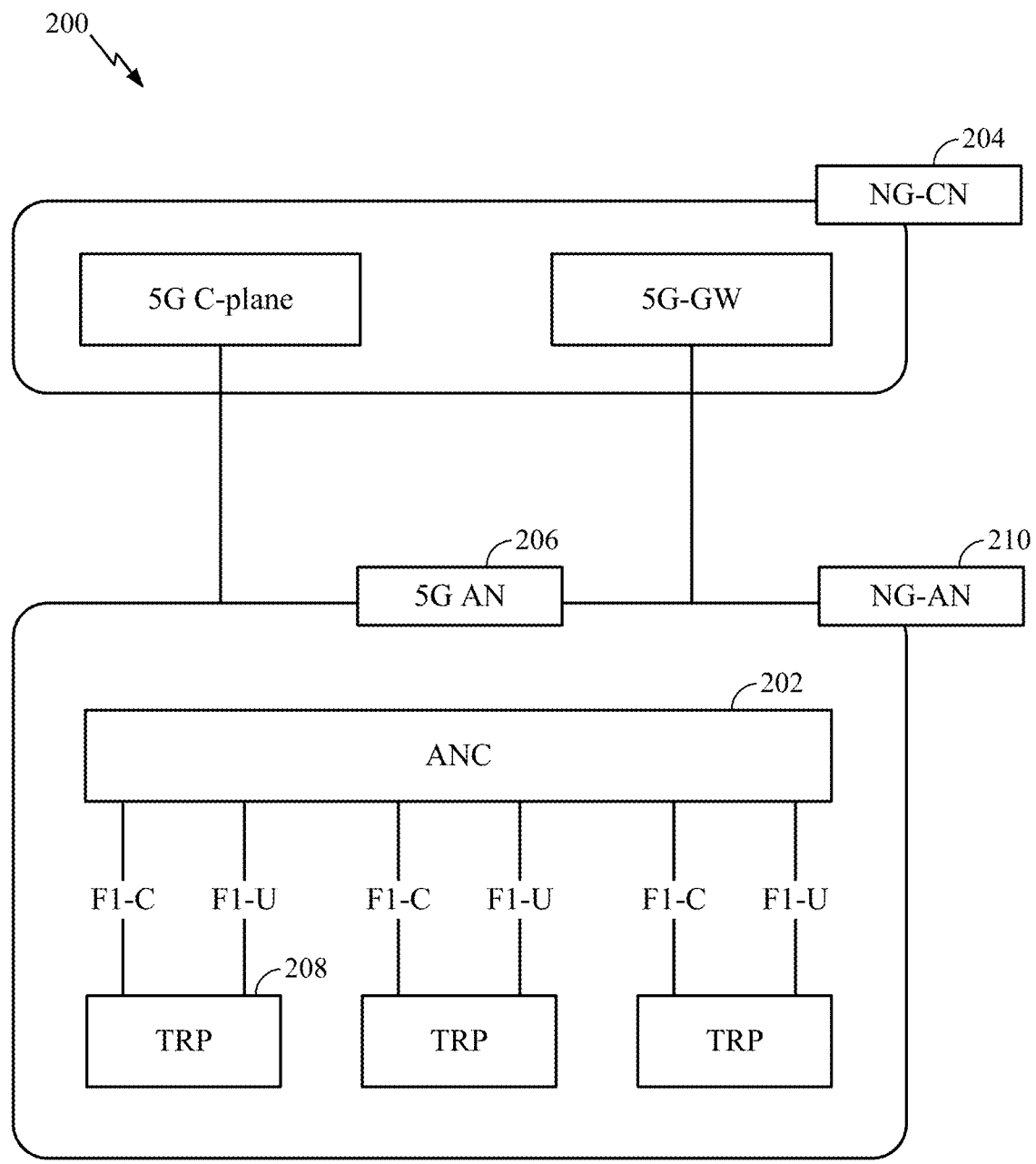
FIG. 2 illustrates an example logical architecture of a distributed radio access network (RAN) that supports LBT operation in an unlicensed DL and licensed UL deployment in accordance with various aspects of the present disclosure.

FIG. 2 illustrates an example logical architecture of a distributed radio access network (RAN) 200 (e.g., which may be implemented in the wireless communications system illustrated in FIG. 1) that supports LBT operation in an unlicensed DL and licensed UL deployment in accordance with various aspects of the present disclosure. A 5G access node 206 may include an access node controller (ANC) 202. The ANC may be a CU of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208 (which may also be referred to as base stations, NR base stations, Node Bs, 5G NBs, APs, eNBs, gNBs, or some other term). As described herein, a TRP 208 may be used interchangeably with "cell."

The TRPs 208 may be examples of DUs. The TRPs 208 may be connected to one ANC (e.g., ANC 202) or more than one ANC. For example, for RAN sharing, radio as a service (RaaS), and service specific ANC deployments, the TRP 208 may be connected to more than one ANC 202. A TRP 208 may include one or more antenna ports. The TRPs 208 may be configured to individually (e.g., dynamic selection) or jointly (e.g., joint transmission) serve traffic to a UE.

The local architecture may be used to illustrate fronthaul definition. The architecture may be defined such that it may support fronthauling solutions across different deployment types. For example, the architecture may be based on transmit network capabilities (e.g., bandwidth, latency, and/or jitter).

The architecture may share features and/or components with LTE. According to aspects, the NG-AN 210 may support dual connectivity with NR. The NG-AN 210 may share a common fronthaul for LTE and NR.

The architecture may enable cooperation between and among TRPs 208. For example, cooperation may be preset within a TRP 208 and/or across TRPs 208 via the ANC 202. According to aspects, no inter-TRP interface may be needed/present.

According to aspects, a dynamic configuration of split logical functions may be present within the architecture. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP 208 or ANC 202, respectively). According to certain aspects, a base station may include a CU (e.g., ANC 202) and/or one or more distributed units (e.g., one or more TRPs 208).

The logical architecture of a distributed RAN 200 may support implementation of LBT operations in an unlicensed DL and licensed UL deployment. In some aspects, the logical architecture may support a transmitter-based LBT scheme. In other aspects, the logical architecture may support a receiver-based LBT scheme.

Figure 3:
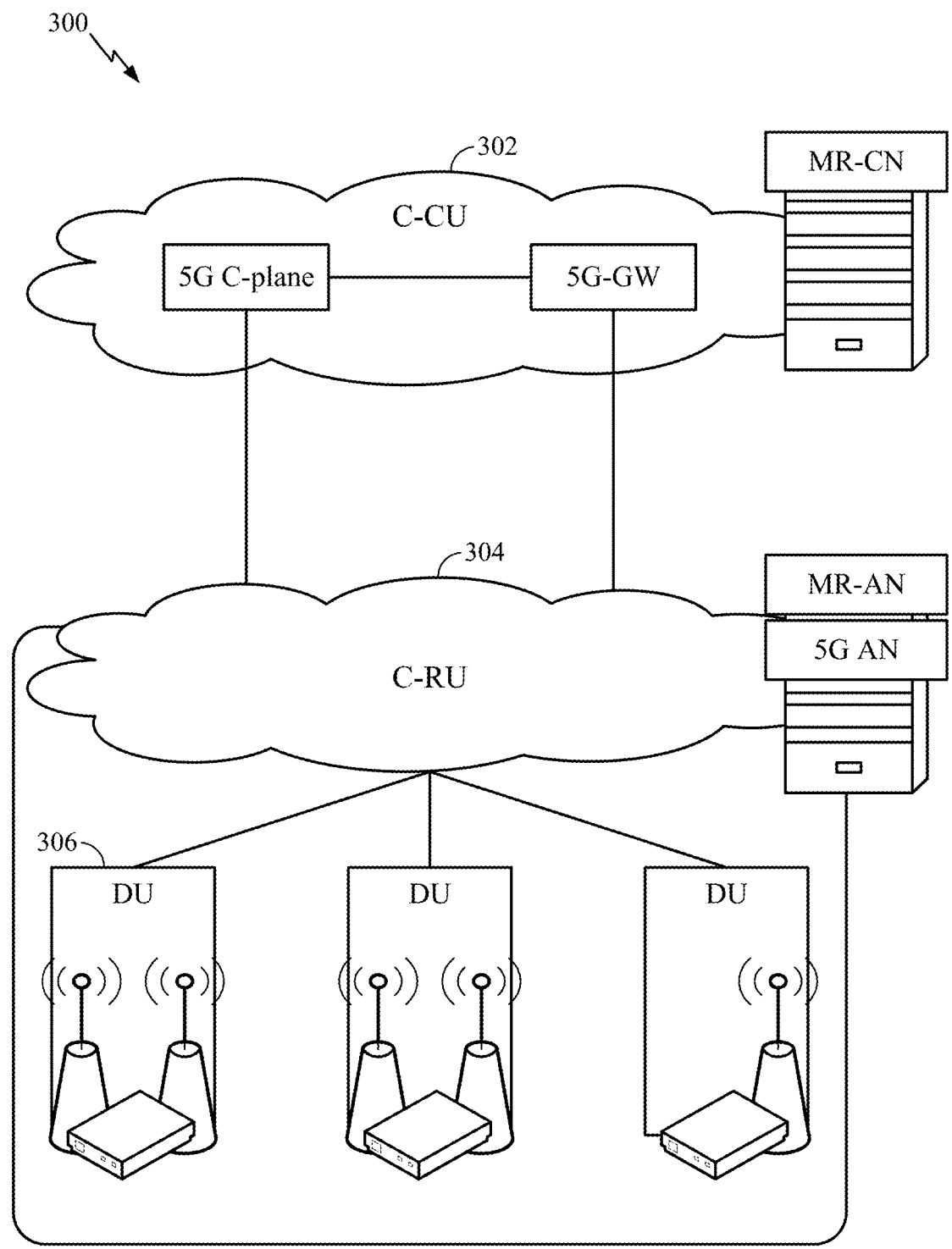
FIG. 3 illustrates an example physical architecture of a distributed RAN that supports LBT operation in an unlicensed DL and licensed UL deployment in accordance with various aspects of the present disclosure.

FIG. 3 illustrates an example physical architecture of a distributed RAN 300 that supports LBT operation in an unlicensed DL and licensed UL deployment in accordance with various aspects of the present disclosure. A centralized core network unit (C-CU) 302 may host core network functions. The C-CU 302 may be centrally deployed. C-CU 302 functionality may be offloaded (e.g., to advanced wireless services (AWSs)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be closer to the network edge.

A DU 306 may host one or more TRPs (e.g., edge nodes (ENs), edge units (EUs), radio heads (RHs), smart radio heads (SRHs), or the like). The DU 306 may be located at edges of the network with RF functionality.

The physical architecture of the distributed RAN 300 may support implementation of LBT operations in an unlicensed DL and licensed UL deployment. In some aspects, the physical architecture may support a transmitter-based LBT scheme. In other aspects, the physical architecture may support a receiver-based LBT scheme.

Figure 4:
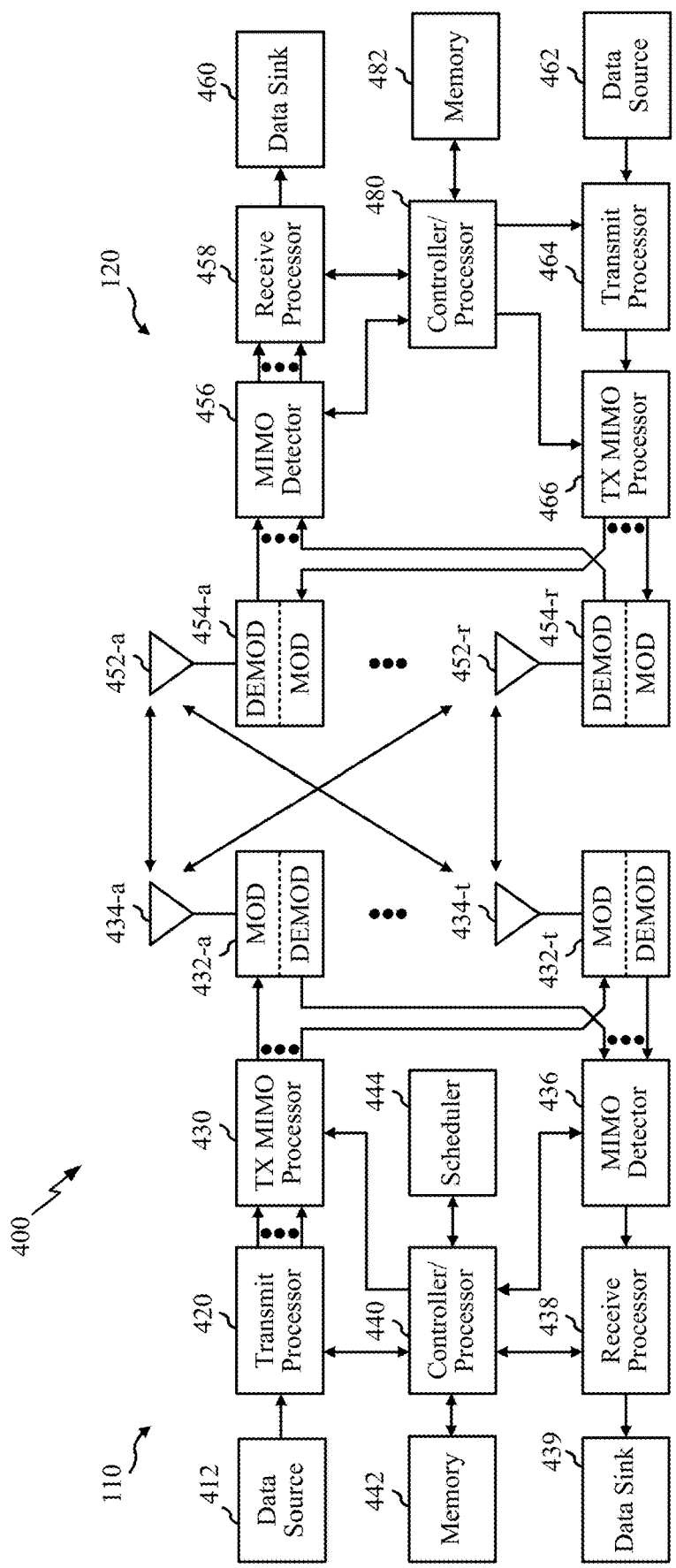
FIG. 4 illustrates an example of a wireless communications system that supports LBT operation in an unlicensed DL and licensed UL deployment in accordance with various aspects of the present disclosure.

FIG. 4 illustrates an example of a wireless communications system 400 that supports LBT operation in an unlicensed DL and licensed UL deployment in accordance with various aspects of the present disclosure. The wireless communications system 400 may include a base station 110 and a UE 120 (e.g., as described with reference to FIG. 1), where components of the base station 110 and UE 120 are illustrated in FIG. 4. As described herein, the base station 110 may include one or more TRPs. One or more components of the base station 110 and UE 120 may be used to practice aspects of the present disclosure. For example, antennas 452, processors 466, 458, 464, and/or controller/processor 480 of the UE 120 and/or antennas 434, processors 430, 420, 438, and/or controller/processor 440 of the base station 110 may be used to perform the operations described herein.

FIG. 4 shows a block diagram of a design of a base station 110 and a UE 120, which may be one of the base stations and one of the UEs described with reference to FIG. 1. For a restricted association scenario, the base station 110 may be the macro base station 110-*c* in FIG. 1, and the UE 120 may be the UE 120-*y*. The base station 110 may also be a base station of some other type. The base station 110 may be equipped with antennas 434-*a* through 434-*t*, and the UE 120 may be equipped with antennas 452-*a* through 452-*r*.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid Automatic repeat request (HARD) Indicator Channel (PHICH), Physical Downlink Control Channel (PDCCH), etc. The data may be for the Physical Downlink Shared Channel (PDSCH), etc. The transmit processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), cell-specific reference signal, etc. A transmit (TX) MIMO processor 430 may perform spatial processing (e.g., precoding) on the data symbols, the control symbols, and/or the reference symbols, if applicable, and may provide output symbol streams to the modulators 432-*a* through 432-*t*. For example, the TX MIMO processor 430 may perform certain aspects described herein for reference signal (RS) multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a DL signal. DL signals from modulators 432-a through 432-t may be transmitted via the antennas 434-a through 434-t, respectively.

At the UE 120, the antennas 452-a through 452-r may receive the DL signals from the base station 110 and may provide received signals to the demodulators 454-a through 454-r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454-a through 454-r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, coordinated multi-point (CoMP) aspects can include providing the antennas, as well as some Tx/receive (Rx) functionalities, such that they reside in DUs. For example, some Tx/Rx processing may be done in the CU, while other processing can be done at the DUs. In accordance with one or more aspects as shown in the diagram, the base station MOD/DEMODs 432 may be in the DUs.

On the UL, at the UE 120, a transmit processor 464 may receive and process data (e.g., for the Physical Uplink Shared Channel (PUSCH)) from a data source 462 and control information (e.g., for the Physical Uplink Control Channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454-a through 454-r (e.g., for SC-FDM, etc.), and transmitted to the base station 110. At the base station 110, the UL signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein. The processor 480 and/or other processors and modules at the UE 120 may also perform or direct processes for the techniques described herein. The memories 442 and 482 may store data and program codes for the base station 110 and the UE 120, respectively. A scheduler 444 may schedule UEs for data transmission on the DL and/or UL.

The components of the base station 110 and UE 120 may support implementation of LBT operation in an unlicensed DL and licensed UL deployment. For example, a UE 120 may receive an RTS signal for the unlicensed DL carrier from a base station 110 on the unlicensed DL carrier using an antenna 452. The UE 120 may transmit, to the base station 110 on a licensed UL carrier, a signal to assist the base station 110 with an LBT operation for the unlicensed DL carrier using a transmit processor 464, TX MIMO processor 466, MOD 454, antenna 452, or some combination of these. The base station 110 may receive the signal to assist with the LBT operation for the unlicensed DL carrier (e.g., at an antenna 432) and may perform the LBT operation for the unlicensed DL carrier, where the LBT operation is modified based on receiving the signal to assist with the LBT operation. Additionally or alternatively, a UE 120 may receive, from a first base station 110 on an unlicensed DL carrier, an RTS signal and may detect, from a second base station 110 on the unlicensed DL carrier, a DL preamble using an antenna 452. The UE 120 may report, to the first base station 110, the detected DL preamble (e.g., using an antenna 452). The base station 110 may receive the reporting of the preamble detected by the UE 120 on the unlicensed DL carrier (e.g., using an antenna 434) and may schedule a transmission to the UE 120 on the unlicensed DL carrier based on the reporting of the preamble, where the scheduling may be performed by a scheduler 444. The UE 120 may receive the downlink transmission from the base station 110 according to the scheduling based on the reported DL preamble.

Figure 5A:
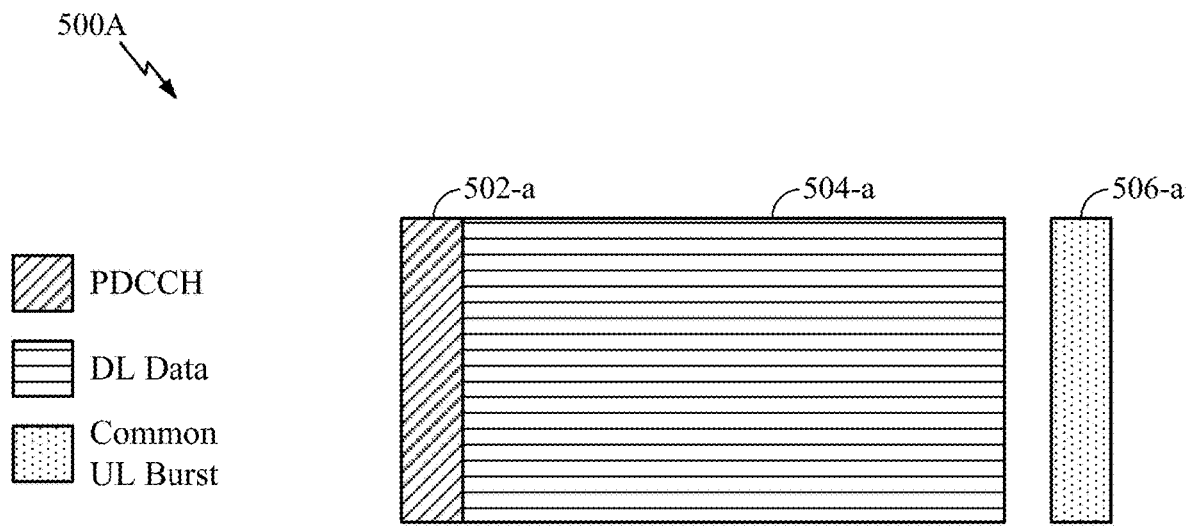
FIG. 5A illustrates an example of a DL-centric subframe that supports LBT operation in an unlicensed DL and licensed UL deployment in accordance with various aspects of the present disclosure.

FIG. 5A illustrates an example of a DL-centric subframe 500A that supports LBT operation in an unlicensed DL and licensed UL deployment in accordance with various aspects of the present disclosure. The DL-centric subframe 500A may include a control portion 502-a. The control portion 502-a may exist in the initial or beginning portion of the DL-centric subframe 500A. The control portion 502-a may include various scheduling information and/or control information corresponding to various portions of the DL-centric subframe 500A. In some configurations, the control portion 502-a may be a PDCCH, as indicated in FIG. 5A.

The DL-centric subframe 500A may also include a DL data portion 504-a. The DL data portion 504-a may sometimes be referred to as the payload of the DL-centric subframe 500A. The DL data portion 504-a may include the communication resources utilized to communicate DL data from a scheduling entity 202 (e.g., eNB, base station, Node B, 5G NB, TRP, gNB, etc.) to a subordinate entity, e.g., a UE 120. In some configurations, the DL data portion 504-a may be a PDSCH.

The DL-centric subframe 500A may also include a common UL portion 506-a. The common UL portion 506-a may sometimes be referred to as an UL burst, a common UL burst, and/or various other suitable terms. The common UL portion 506-a may include feedback information corresponding to various other portions of the DL-centric subframe 500A. For example, the common UL portion 506 may include feedback information corresponding to the control portion 502-a. Non-limiting aspects of feedback information may include an acknowledgment (ACK) signal, a negative acknowledgment (NACK) signal, a hybrid automatic repeat request (HARD) indicator, and/or various other types information. The common UL portion 506-a may include additional or alternative information, such as information pertaining to random access channel (RACH) procedures, scheduling requests (SRs), SRSs, and various other suitable types of information.

As illustrated in FIG. 5A, the end of the DL data portion 504-a may be separated in time from the beginning of the common UL portion 506-a. This time separation may sometimes be referred to as a gap, a guard period (GP), a guard interval, and/or various other suitable terms. This separation provides time for the switchover from DL communication (e.g., reception operation by the subordinate entity, e.g., UE 120) to UL communication (e.g., transmission by the subordinate entity, e.g., UE 120). One of ordinary skill in the art will understand, however, that the foregoing is merely one aspect of a DL-centric subframe 500A and alternative structures having similar features may exist without necessarily deviating from the aspects described herein.

The DL-centric subframe 500A may support implementation of LBT operations in a system with unlicensed DL and licensed UL carriers. The LBT operations may be examples of transmitter-based LBT schemes, receiver-based LBT schemes, or combinations thereof. In some aspects, a UE may receive an RTS signal for an unlicensed DL carrier on the unlicensed DL carrier according to a DL-centric subframe 500A. The request may be received by the UE in a DL-centric subframe 500A during a control portion 502-a, a DL data portion 504-a, or a combination thereof.

Figure 5B:
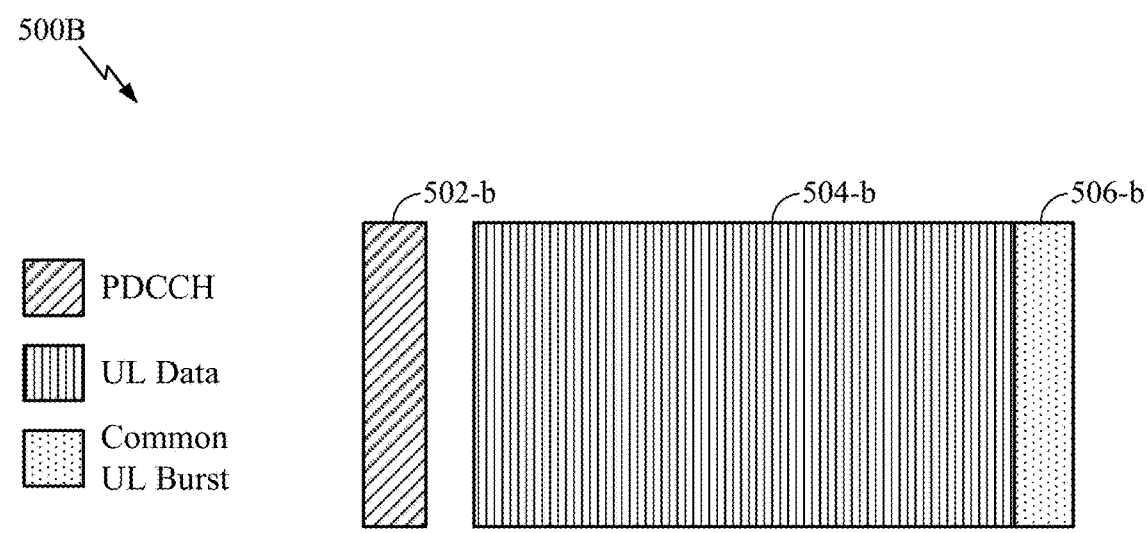
FIG. 5B illustrates an example of an UL-centric subframe that supports LBT operation in an unlicensed DL and licensed UL deployment in accordance with various aspects of the present disclosure.

FIG. 5B illustrates an example of an UL-centric subframe 500B that supports LBT operation in an unlicensed DL and licensed UL deployment in accordance with various aspects of the present disclosure. The UL-centric subframe 500B may include a control portion 502-b. The control portion 502-b may exist in the initial or beginning portion of the UL-centric subframe 500B. The control portion 502-b in FIG. 5B may be similar to the control portion 502-a described herein with reference to FIG. 5A. The UL-centric subframe 500B may also include an UL data portion 504-b. The UL data portion 504-b may sometimes be referred to as the payload of the UL-centric subframe 500B. The UL portion may refer to the communication resources utilized to communicate UL data from the subordinate entity (e.g., a UE 120) to the scheduling entity 202 (e.g., a base station 110). In some configurations, the control portion 502-b may be a PUSCH. As illustrated in FIG. 5B, the end of the control portion 502-b may be separated in time from the beginning of the UL data portion 504-b. This time separation may sometimes be referred to as a gap, GP, guard interval, and/or various other suitable terms. This separation provides time for the switchover from DL communication (e.g., reception operation by the scheduling entity 202) to UL communication (e.g., transmission by the scheduling entity 202).

The UL-centric subframe 500B may also include a common UL portion 506-b. The common UL portion 506-b in FIG. 5B may be similar to the common UL portion 506-a described herein with reference to FIG. 5A. The common UL portion 506-b may additionally or alternatively include information pertaining to channel quality indicators (CQIs), SRSs, and various other types of information. One of ordinary skill in the art will understand that the foregoing is merely one aspect of an UL-centric subframe 500B and alternative structures having similar features may exist without necessarily deviating from the aspects described herein.

As described herein, an UL-centric subframe 500B may be used for transmitting UL data from one or more mobile stations to a base station, and a DL centric subframe may be used for transmitting DL data from the base station to the one or more mobile stations. In one aspect, a frame may include both UL-centric subframes 500B and DL-centric subframes 500A. In this aspect, the ratio of UL-centric subframes 500B to DL-centric subframes 500A in a frame may be dynamically adjusted based on the amount of UL data and the amount of DL data to be transmitted. For example, if there is more UL data, then the ratio of UL-centric subframes 500B to DL-centric subframes 500A may be increased. Conversely, if there is more DL data, then the ratio of UL-centric subframes 500A to DL-centric subframes 500B may be decreased.

The UL-centric subframe 500B may support implementation of LBT operation in a system supporting unlicensed DL and licensed UL carriers. In some aspects, a UE may transmit to a base station on a licensed UL carrier a signal to assist a base station with an LBT operation for an unlicensed DL carrier. The signal received by the base station may be carried in an UL-centric subframe 500B during a control portion 502-b, UL data portion 504-b, or common UL portion 506-b, or a combination thereof. In other aspects, the UE may transmit a CTS on either a licensed UL channel or an unlicensed DL channel to a serving base station. In either of these cases (e.g., even if transmitting on the unlicensed DL channel), the UE may transmit according to the UL-centric subframe 500B.

Figure 6A:
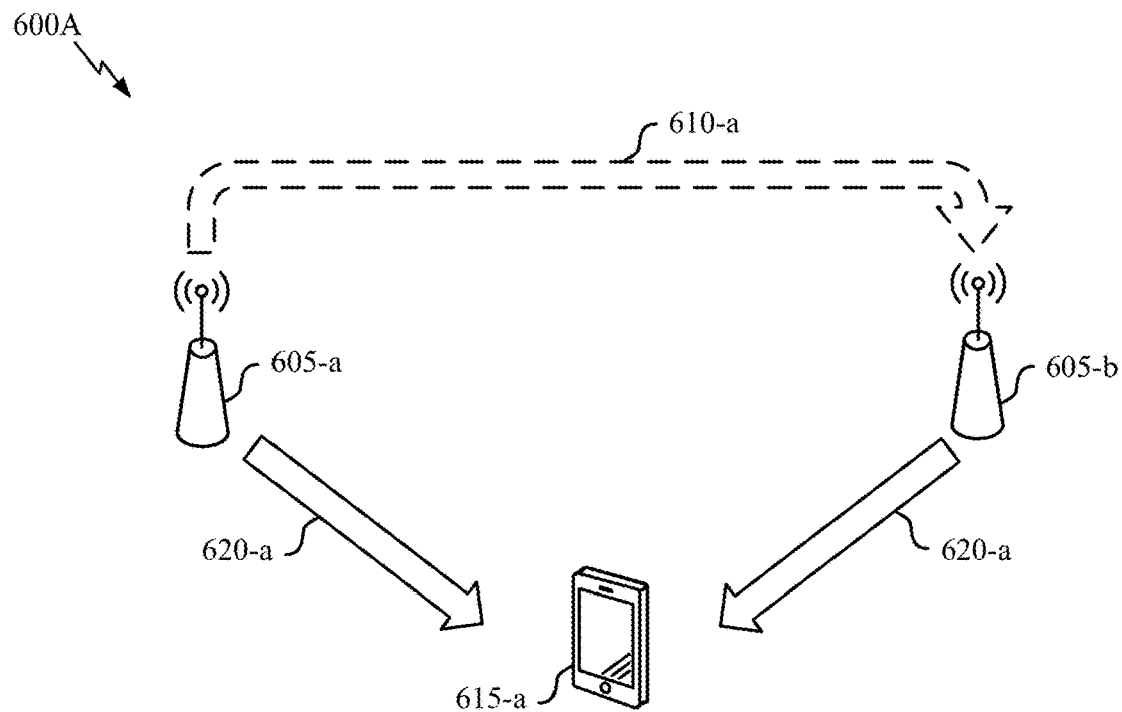
FIGS. 6A, 6B, and 6C illustrate examples of wireless communications systems that support LBT operation in unlicensed DL and licensed UL deployments in accordance with various aspects of the present disclosure.

FIG. 6A illustrates an example of a wireless communications system 600A that supports LBT operation in an unlicensed DL and licensed UL deployment in accordance with various aspects of the present disclosure. The example illustrated in FIG. 6A may include a base station 605-a (e.g., a transmitting node) that is hidden from a base station 605-b. For the unlicensed DL and the licensed UL operation, the DL and UL may be transmitted on different bands. Wireless communications systems as described herein may perform LBT and report DL CSI in cases where unlicensed DL and licensed UL operation is supported. Scheduling on the licensed UL may be controlled using uplink grants (e.g., transmitted by a base station, such as base station 605-b). One aspect of a licensed UL and unlicensed DL deployment is one channel in the sub-6 GHz spectrum and one channel in the mmW spectrum. In another aspect, one channel may be in the 3.5 GHz spectrum and the other may be in the 900 MHz spectrum. It is noted that some of the UL transmissions may be autonomous, which may not use UL grant-based scheduling.

Wireless devices may gain access to an unlicensed channel using an LBT scheme. LBT is not used for the licensed UL band, as wireless devices may be scheduled using UL grants. If both the UL and DL are unlicensed, the request to send (RTS)/CTS mechanism may be used, where a base station (e.g., base station 605-b) sends an RTS and a UE (e.g., UE 615-a) responds with a CTS. Other base stations may back off from using the medium based on the RTS, CTS, or both. In a first aspect, the wireless communications system 600A may implement a transmitter-based LBT scheme. In this aspect, a base station may use LBT on the DL unlicensed band to listen to potential signals or energy from other wireless devices (e.g., other DL base stations, other transmission nodes, etc.). If the base station detects a signal from another base station on the DL unlicensed band or the energy is above the ED threshold, the base station may refrain from transmitting on the medium. To support transmitter-based LBT, the base station may support a receive (Rx) capability on the DL unlicensed band so that it may detect signals on the DL unlicensed band in addition to supporting a transmit (Tx) capability on the DL unlicensed band.

However, a transmitter-based LBT scheme may not effectively detect interference. First, the interference on the DL carrier on the base station Rx side may not be identical to (or accurately measure) the interference on the same carrier on the UE Rx side. That is, if base station 605-b listens to the DL unlicensed channel in a transmitter-based LBT scheme, the base station 605-b may not detect the same interference (e.g., within a threshold interference difference) as UE 615-a experiences on the DL unlicensed channel. For example, hidden node (e.g., hidden base station) and exposed node (e.g., exposed base station) issues may occur with a transmitter-based LBT scheme.

The hidden node problem occurs when a transmitting device performing LBT does not hear another transmitting device on the channel, even though a receiving device may detect signals from both of these transmitting devices. For example, a base station 605-*b* (e.g., a transmit node) may not detect a transmission from another base station 605-*a* (e.g., another transmit node), while a UE 615-*a* may receive interference when both base stations are transmitting simultaneously. For example, base station 605-*b* may perform a transmitter-based LBT operation and, as illustrated by 610-*a*, may not detect base station 605-*a* transmitting on the DL unlicensed channel 620-*a*. (e.g., due to the distance between transmit nodes, interference between transmit nodes, etc.). As such, base station 605-*b* may determine that the channel 620-*a* is clear and may also transmit on channel 620-*a* based on the LBT operation. This is illustrated in FIG. 6A where base station 605-*a* (e.g., transmitting node) is hidden from base station 605-*b* (e.g., transmitting node), but a UE 615-*a* in the coverage of base station 605-*a* may receive interference from base station 605-*b*.

A receiver-based LBT scheme may be more robust than a transmitter-based LBT scheme for transmitting on the unlicensed spectrum in the DL.

Figure 6B:
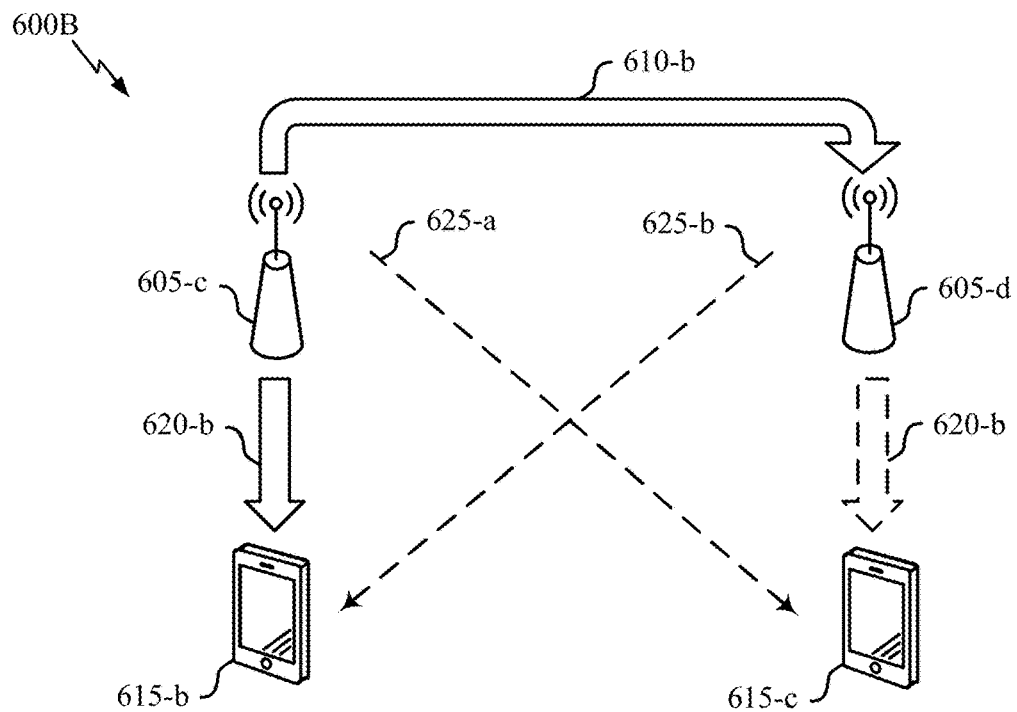

FIG. 6B illustrates an example of a wireless communications system 600B that supports LBT operation in an unlicensed DL and licensed UL deployment in accordance with various aspects of the present disclosure. In some aspects, wireless communications system 600B may illustrate a transmitter-based LBT scheme such that base stations e.g., transmitting nodes) are exposed to transmissions from other base stations (e.g., transmitting nodes). This may pose a problem for the transmitter-based LBT scheme.

The exposed node (e.g., exposed base station) problem may occur when one base station 605-*d* detects a transmission of another base station 605-*c*, even though there may not be interference to the intended UEs 615-*b* and 615-*c* served by these base stations if the base stations transmit simultaneously. This exposed node problem causes spectrum inefficiency because one of the base stations (e.g., base station 605-*d*) stops transmission (e.g., backs off the medium) preemptively to avoid colliding with a transmission of another base station (e.g., base station 605-*c*) on the DL unlicensed channel 620-*b*, even though the base station 605-*c* could successfully transmit simultaneously on the DL unlicensed channel 620-*b* without interfering with the UEs these base stations serve. This is illustrated in FIG. 6B where base station 605-*d* is exposed to a transmission from base stations 605-*c*, as illustrated by 610-*b*, but the UEs are not subject to interference from the non-serving base stations (e.g., the transmitting nodes). That is, while base station 605-*d* detects the transmission by base station 605-*c* on the DL unlicensed channel 620-*b* during an LBT operation and backs off the channel, UE 615-*c* does not detect this transmission, as illustrated at 625-*a*. Similarly, UE 615-*b* may not detect a transmission by base station 605-*d* on the DL unlicensed channel 620-*b*, as illustrated by 625-*b*. As such, base station 605-*d* backs off, despite UEs 615-*b* and 615-*c* supporting base stations 605-*c* and 605-*d* transmitting overlapping transmissions on the DL unlicensed channel 620-*b*.

A receiver-based LBT scheme may be more robust than a transmitter-based LBT scheme with regard to exposed nodes (e.g., base stations), as the receiving devices may accurately determine which transmitting devices (e.g., nodes) cause interference at the receiving devices.

Figure 6C:
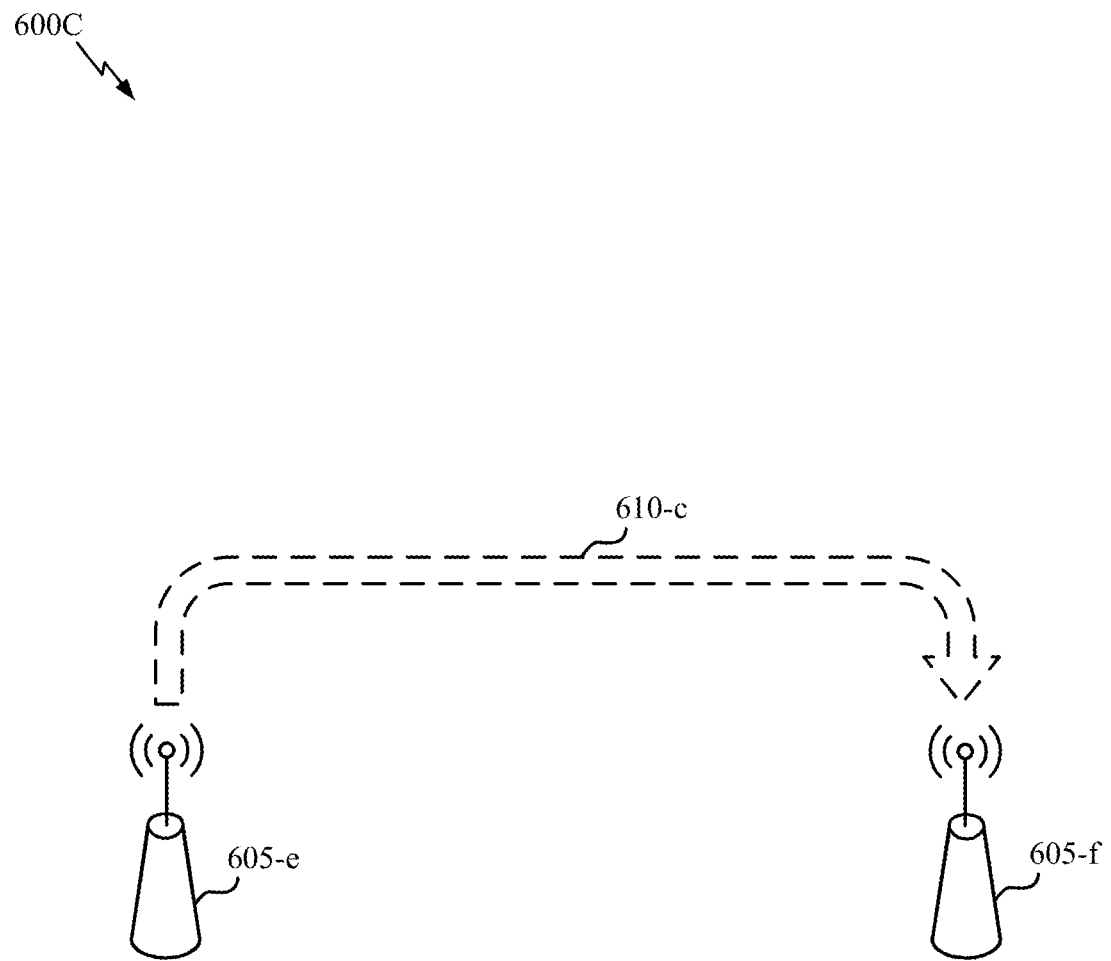

FIG. 6C illustrates an example of a wireless communications system 600C that supports LBT operation in an unlicensed DL and licensed UL deployment in accordance with various aspects of the present disclosure. In some aspects, wireless communications system 600C may illustrate a transmitter-based LBT scheme where a base station uses an LBT operation on a DL band in the unlicensed spectrum. Base station 605-*e* (e.g., a first transmitting node) and base station 605-*f* (e.g., a second transmitting node) are base stations transmitting in an unlicensed DL channel. If base station 605-*e* transmits on the unlicensed DL to communicate with a UE and interference from the communication leaks on to base station 605-*f* (as illustrated by 610-*c*, base station 605-*f* detects interference from base station 605-*e* during an LBT process for the unlicensed DL channel), base station 605-*f* may back off from using the unlicensed DL channel (e.g., to avoid colliding with the transmission by base station 605-*e*).

In some cases, a beam from one base station transmission may not be heard (i.e., detected) by a second base station, but may cause interference to a UE (e.g., as illustrated in FIG. 6A). In other cases, a beam from one base station transmission may be heard (i.e., detected) by a second base station, but may not cause interference to a UE (e.g., as illustrated in FIG. 6B). When doing narrow beam-forming, interference leaked to a UE may be reduced by better controlling the direction of the transmit beam. In some cases, a transmitter-based LBT scheme may implement one or more techniques to reduce or negate one or more of these effects (e.g., the hidden node effect, the exposed node effect, or both). In other cases, a receiver-based LBT scheme may be more robust than a transmitter-based LBT scheme with regard to hidden nodes, exposed nodes, or both, especially for transmissions in the DL unlicensed spectrum.

Figure 7:
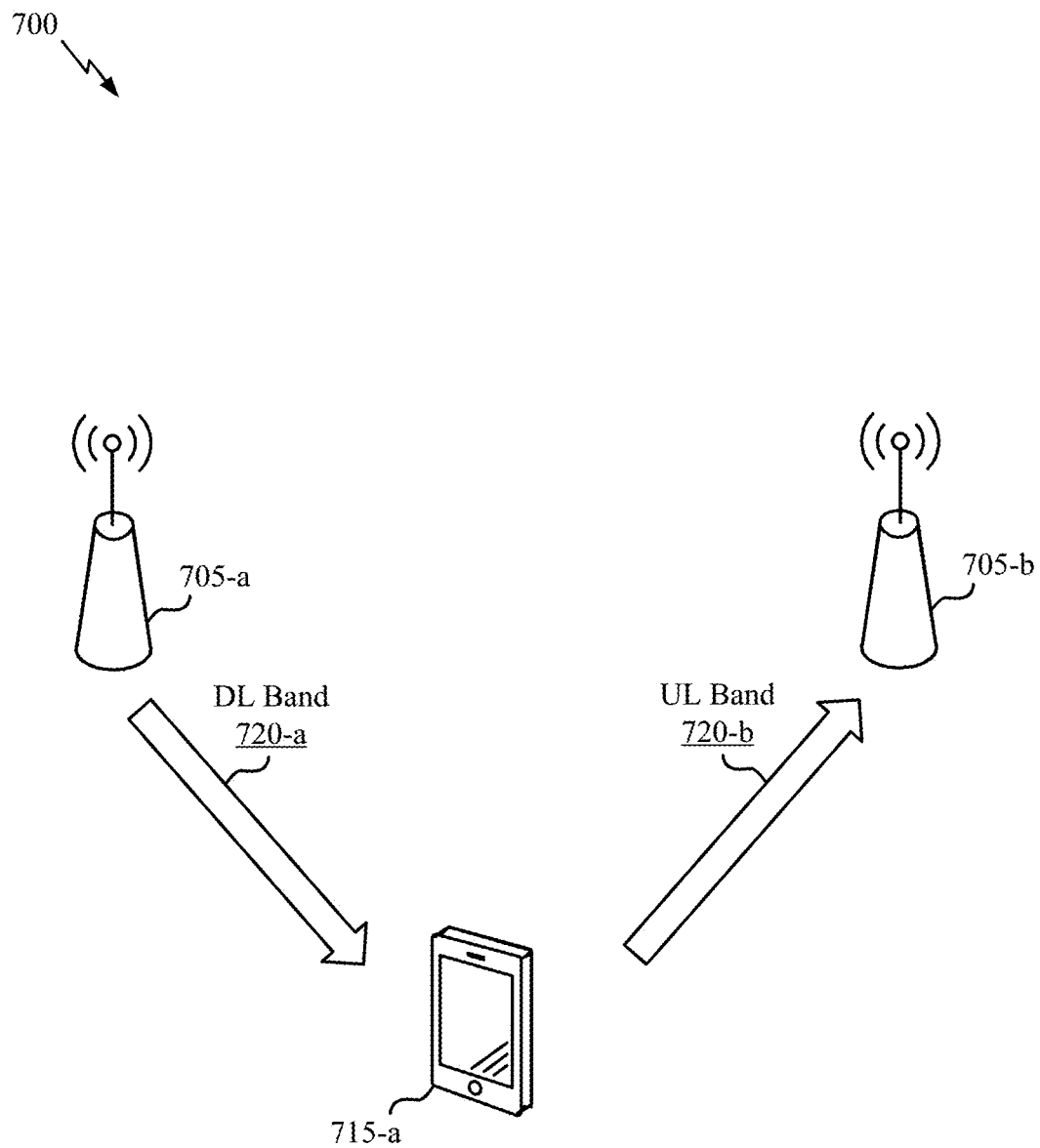
FIG. 7 illustrates an example of a wireless communications system that supports LBT operation in an unlicensed DL and licensed UL deployment in accordance with various aspects of the present disclosure.

FIG. 7 illustrates an example of a wireless communications system 700 that supports LBT operation in an unlicensed DL and licensed UL deployment in accordance with various aspects of the present disclosure. In some aspects, wireless communications system 700 illustrates a receiver-based LBT scheme, where a UE may perform an RTS/CTS procedure, and a transmitting base station may listen for a CTS message on a licensed UL channel (e.g., another base station's licensed UL channel). In some aspects, a UE 715-*a* (e.g., a receiver) receives an RTS from a serving base station 705-*a* (e.g., on a DL band 720-*a*, such as an unlicensed or licensed DL band). The UE 715-*a* may send signaling to assist with an LBT operation (e.g., an LBT operation performed by base station 705-*b*). For example, the UE 715-*a* may transmit a CTS on an UL band 720-*b* (e.g., a licensed uplink band for serving base station 705-*a*), and base station 705-*b* may monitor the UL band 720-*b* for transmissions. This may improve robustness and improve capacity as compared to a transmitter-based LBT scheme.

There may be multiple ways in which a receiver-based LBT scheme is implemented. In some aspects, the information sent by the UE 715-*a* may be a CTS message which the UE 715-*a* sends on the licensed UL spectrum, and an interfering base station may detect the CTS message. For example, UE 715-*a* may transmit a CTS on an UL band 720-*b* to the serving base station 705-*a*, and a potentially interfering base station 705-*b* may monitor the licensed UL band 720-*b* for serving base station 705-*a* and receive the CTS. To support these processes, the interfering base station 705-*b* may support a receive capability on the licensed UL bands for one or more other base stations (e.g., in addition to supporting a receive capability on its own licensed UL band). If the base station 705-*b* has information to transmit on the DL band 720-*a*, the base station 705-*b* may monitor one or more UL bands 720-*b* for other nearby base stations sharing the unlicensed DL band 720-*a* in an LBT procedure. In some aspects, the base station 705-*b* may additionally have a receive capability on an unlicensed DL band (e.g., DL band 720-*a*).

Base station 705-a (e.g., a transmitting node) may monitor for and receive the CTS in its licensed UL band 720-b. In these cases, base station 705-a may transmit on the unlicensed DL band 720-a to UE 715-a based on the CTS message. Additionally, the CTS signal may be heard (i.e., detected) by interfering base station 705-b via UL band 720-b. When the base station 705-b detects the CTS signal for base station 705-a in the licensed UL band 720-b, the base station 705-b may refrain from transmitting on the unlicensed DL band 720-a based on the CTS. In this case, the CTS is sent on a licensed UL band 720-b different from the unlicensed DL band 720-a to which the CTS corresponds. The CTS may implicitly or explicitly indicate the unlicensed DL band 720-a that the UE 715-a determined is clear. For example, in one aspect, the CTS message may explicitly carry identification information about the unlicensed DL carrier for which it is signaled. In another aspect, the base station may indicate to the UEs (e.g., via a broadcast signal), the signaling space (e.g., time/frequency resources) of CTS messages on the licensed UL carrier that correspond to the unlicensed DL carrier. In some aspects, scheduling and grants on the licensed UL may support the CTS.

Figure 8:
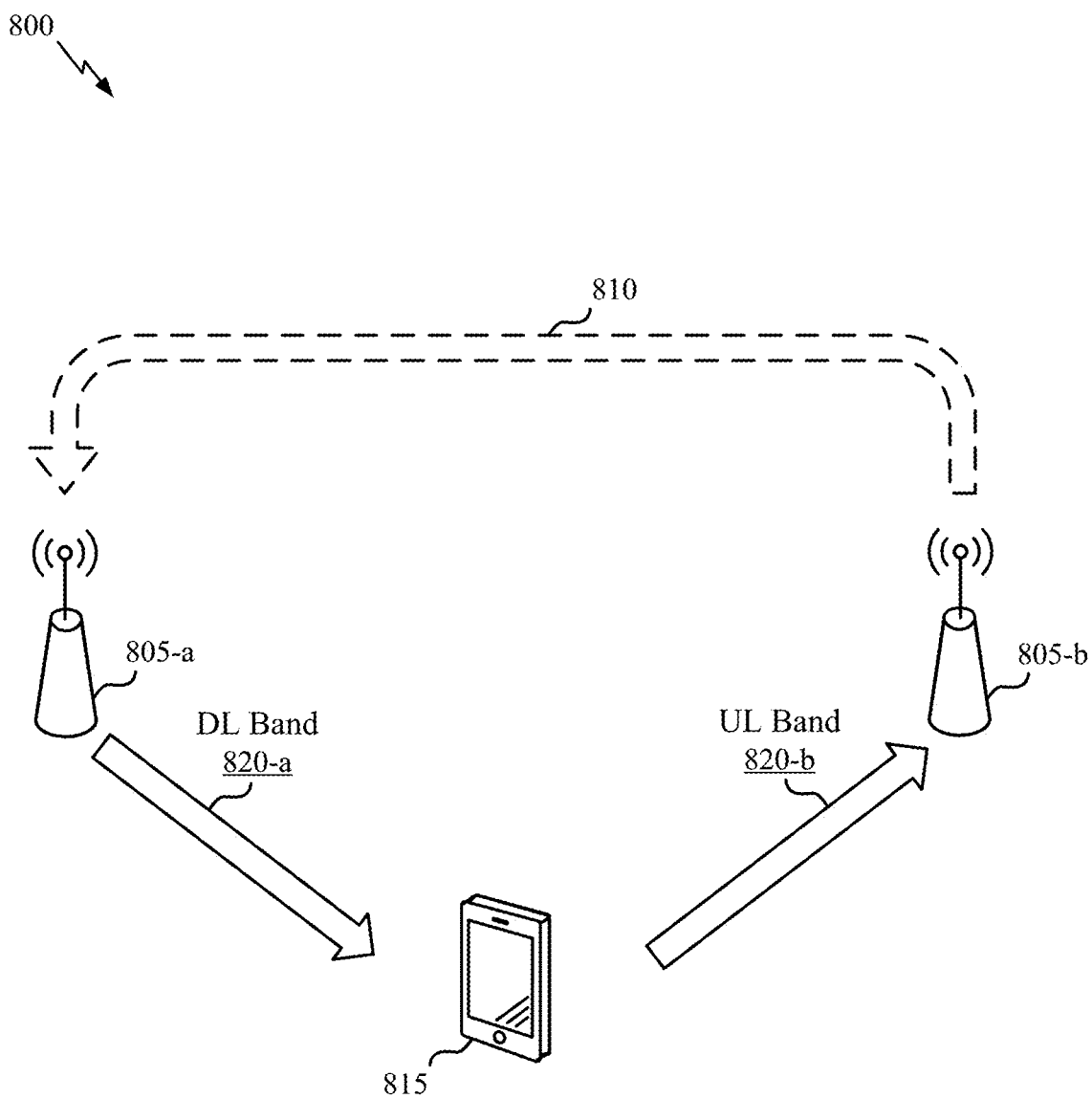
FIG. 8 illustrates an example of a wireless communications system that supports LBT operation in an unlicensed DL and licensed UL deployment in accordance with various aspects of the present disclosure.

FIG. 8 illustrates an example of a wireless communications system 800 that supports LBT operation in an unlicensed DL and licensed UL deployment in accordance with various aspects of the present disclosure. In some aspects, wireless communications system 800 illustrates a receiver-based LBT scheme such that a UE may listen (i.e., monitor) for a DL preamble from a base station (e.g., a DL node) and may report information to its serving base station (e.g., based on preamble detection). For example, UE 815 may determine whether there is interference coming from one or more non-serving base stations in the wireless communications system 800.

In FIG. 8, a UE 815 may be served by serving base station 805-b. The UE 815 may monitor for DL preamble transmissions from other DL base stations (e.g., DL nodes, such as base station 805-a, which may be examples of interferer base stations if detected) on the unlicensed DL band 820-a. If the UE 815 detects a DL preamble from base station 805-a on the unlicensed DL band, the UE 815 may report the preamble detection to its serving base station 805-b on an UL band 820-b (e.g., a licensed UL band). In some cases, the UE 815 may measure the interference from the interfering base stations and report this interference to serving base station 805-b. In one aspect, the serving base station 805-b may implement a passive scheme and choose to schedule the UE 815 based on the preamble detection reported by the UE 815 (e.g., where the scheduling may be further based on the network allocation vector (NAV), the corresponding CSI, or both). The serving base station 805-b may choose not to schedule communications with the UE 815 when interference from interfering base stations, like base station 805-a, is present based on the preamble reported by the UE 815. NAV parameters may include more details about the interfering base stations identities, including but not limited to an amount of resources used by an interfering base station (e.g., an interfering node), how long the interfering base station may occupy a medium, etc. In addition, the CSI report from the UE 815 may give an indication of how strong the interference is (e.g., at UE 815).

In another aspect, based on the UE's preamble detection report, the serving base station 805-b may implement an aggressive scheme and send signaling to other base stations, such as base station 805-a, which may cause interference to the UE 815. The serving base station 805-b may request the other base stations to be silent (e.g., refrain from transmitting) or to reduce the magnitude of their interference (e.g., transmit using a lower transmit power). In some cases, the signaling may request for the interfering base station(s) to back off the unlicensed DL band 820-a for a particular amount of time or time window. In one aspect, the signal from the serving base station 805-b (e.g., the serving node) to the interfering base station 805-a (e.g., the interfering node) may be sent on the unlicensed DL band 820-a. In this aspect, the base stations may listen to (i.e., receive on) the unlicensed DL band 820-a, in addition to supporting transmission capabilities on the unlicensed DL band 820-a. In a second aspect, for the base stations to support the aggressive schemes where they exchange information pertaining to the UE reports about interference from neighboring base stations, the base stations may exchange information with other base stations via inter-base station signaling 810. If the base stations transmit this information over-the-air (OTA) using the DL spectrum (e.g., an unlicensed DL band 820-a), other base stations may support the capability to receive the information using a module similar to a Network Listen (NL) module. In some cases, inter-base station signaling 810 may be exchanged via backhaul (e.g., wireless or wireline backhaul) based on an X2 interface between the base stations 805-b and 805-a, instead of or in addition to OTA signaling based on OTA network listen capabilities on the DL. If the base stations are capable of communicating over the backhaul, they may use the same backhaul link to exchange signaling pertaining to UE reports. Note that in some deployments (e.g., uncoordinated small cells), backhaul communications may not be available. If the backhaul is not present, OTA communication based on network listen support may be implemented.

Figure 9A:
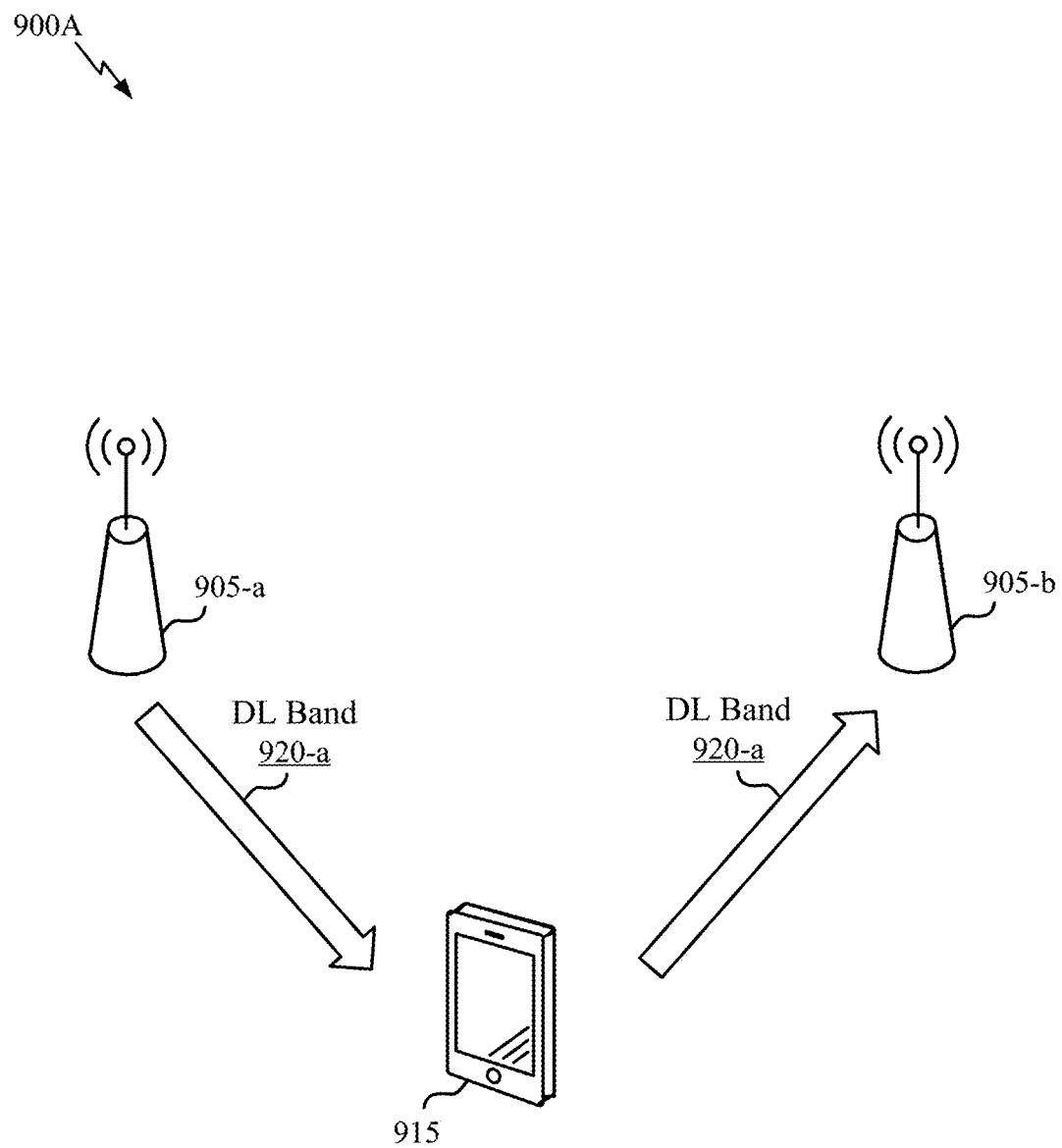
FIG. 9A illustrates an example of a wireless communications system that supports LBT operation in an unlicensed DL and licensed UL deployment in accordance with various aspects of the present disclosure.

FIG. 9A illustrates an example of a wireless communications system 900A that supports LBT operation in an unlicensed DL and licensed UL deployment in accordance with various aspects of the present disclosure. In some aspects, wireless communications system 900A illustrates a receiver-based LBT scheme. In some aspects, a UE 915 may support transmitting in the unlicensed DL band and base stations may support listening (e.g., monitoring and receiving) in the unlicensed DL band. The UE 915 may monitor for DL preamble transmissions from other base stations (e.g., a DL node, such as base station 905-a) on the unlicensed DL band 920-a and may send a CTS on the unlicensed DL band 920-a. Other base stations, such as base station 905-b, may monitor the unlicensed DL band 920-a for CTS messages for other base stations. Base station 905-b may monitor for the CTS from the UE 915 and decide whether to transmit or not on the unlicensed DL band 920-a based on the monitoring. For example, if the UE 915 transmits a CTS for the base station 905-a to transmit on the unlicensed spectrum, base station 905-b may detect the CTS, determine that the CTS corresponds to a different base station, and refrain from transmitting on the unlicensed spectrum based on the CTS.

The UE 915 may support UL RF capability in the unlicensed DL. In some aspects, a UE may be configured to operate according to implementations detailed in FIG. 7, 8, or 9A, or a combination thereof. In some aspects, the implementation described in FIG. 8 may be the UE's default and the UE may decide to switch to the implementation detailed in FIG. 9A to leverage the unlicensed band to provide the CTS.

Figure 9B:
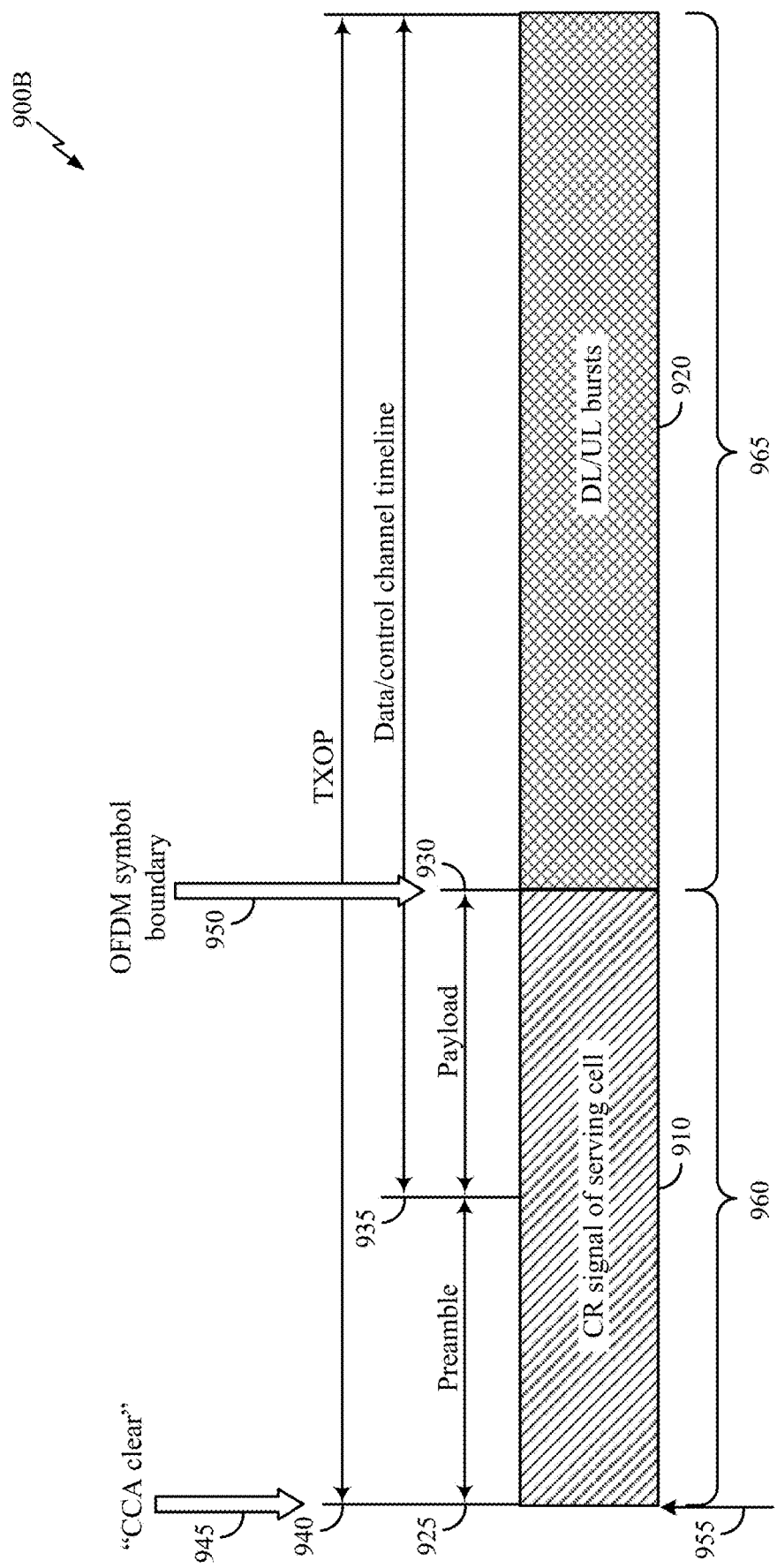
FIG. 9B illustrates an example of a channel reservation (CR) signaling procedure that supports LBT operation in an unlicensed DL and licensed UL deployment in accordance with various aspects of the present disclosure.

FIG. 9B illustrates an example of a channel reservation (CR) signaling procedure 900B that supports LBT operation in an unlicensed DL and licensed UL deployment in accordance with various aspects of the present disclosure. The CR signaling procedure 900B may include a CR signal 910 from a serving cell and DL/UL bursts 920 (e.g., on a DL or UL medium). The CR signal 910 may include a preamble 925 and payload 930. The preamble(s) 925 may contain signaling (e.g., a network allocation vector (NAV)) that reserves or covers the channel until the end of an LBT frame. The NAV may be used to indicate the duration of medium reservation. The preamble 925 may serve to communicate channel reservation or to reserve channel resources. A portion of the CR signal 910 and DL/UL bursts 920 may include data 935 (e.g., NR data), a control channel timeline, or a combination thereof. The CR signal 910 and DL/UL bursts 920 may be transmitted within a transmission opportunity (TXOP) 940 for the CR signaling procedure 900B. At 955, the serving cell may identify a TXOP 940 for the serving cell and may transmit the CR signal 910 in the TXOP 940. At 960, aggressors (e.g., nodes, such as UEs, base stations, or both) may detect the CR preamble and decode the payload. The aggressors may backoff from medium access as dictated by the medium occupancy time signaled in NAV. At 965, nodes (e.g., UEs, base stations, or both) of the serving cell may access the medium for the rest of TXOP 940, performing DL burst transmissions, uplink burst transmissions, or both. At 945, a CCA may be established and at 950, there may exist an OFDMA symbol boundary (e.g., between the CR signaling and DL/UL bursts).

Figure 10:
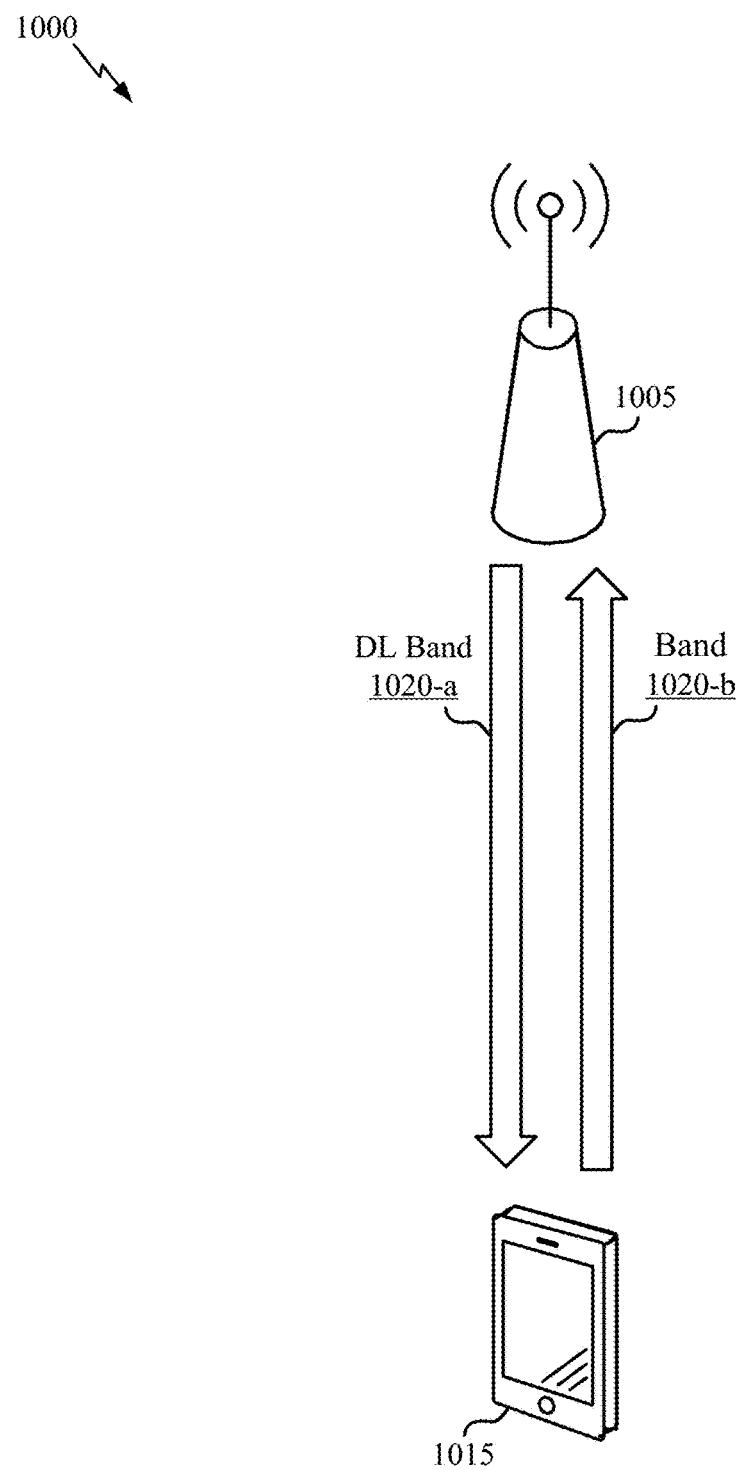
FIG. 10 illustrates an example of a wireless communications system that supports LBT operation in an unlicensed DL and licensed UL deployment in accordance with various aspects of the present disclosure.

FIG. 10 illustrates an example of a wireless communications system 1000 that supports LBT operation in an unlicensed DL and licensed UL deployment in accordance with various aspects of the present disclosure. The wireless communications system 1000 illustrates how a base station 1005 and UE 1015 may handle CSI when communicating using an unlicensed DL band 1020-a and a licensed UL band. As the DL and UL transmissions are in different bands, if a device transmits transmits on one band, but may not receive on that band, channel reciprocity may not be supported to estimate channel conditions (e.g., since bidirectional communication is not done on the same path).

In some aspects, base station 1005 may send CSI-RS on the DL band 1020-a and the UE 1015 may report the DL CSI explicitly in the UL band (e.g., band 1020-b, a licensed UL band) to report the channel conditions. However, with explicit CSI reporting, the UL overhead may be excessive if the system supports near-ideal CSI performance. The CSI reports may contain cumulative reports for the whole band, sub-band reports, etc, and the base station 1005 may utilize the CSI to determine modulation and coding rate, transmit power, etc. In some cases, the CSI report may be very large (e.g., above a certain payload threshold in order to carry the necessary information). Thus, with explicit CSI reporting, the UL overhead for the UE 1015 may be relatively large.

In other aspects, to support estimating the channel quality of the DL band 1020-a, the UE 1015 may send one or more SRSs in the unlicensed DL band (e.g., band 1020-b, where band 1020-b is the same as band 1020-a) to the base station 1005. The base station 1005 may receive the SRSs and estimate the DL channel conditions. In this case, the channel from base station 1005 to the UE 1015 (e.g., the unlicensed DL band 1020-a) is reciprocal to the channel from the UE 1015 to the base station 1005 (e.g., also the unlicensed DL band 1020-a). The reporting overhead may be significantly reduced via the UE SRS transmission (e.g., as compared to the explicit CSI signaling). The UE 1015 may send the SRS as implicit DL channel feedback to a serving transmit base station 1005 (e.g., a transmitting node). The serving base station 1005 may then calculate DL channel conditions from the SRS received from the UE 1015. As a result, the UE 1015 may not have to report the DL CSI explicitly in the UL, thereby reducing overhead. In some cases, UL SRS-based DL channel estimation may support channel estimates that are available at the base station 1005 much faster as compared to the DL CSI-RS-based channel estimation. This may be due to the latency involved in scheduling UL resources at a future time for the UE 1015 to send the CSI feedback.

Figure 11:
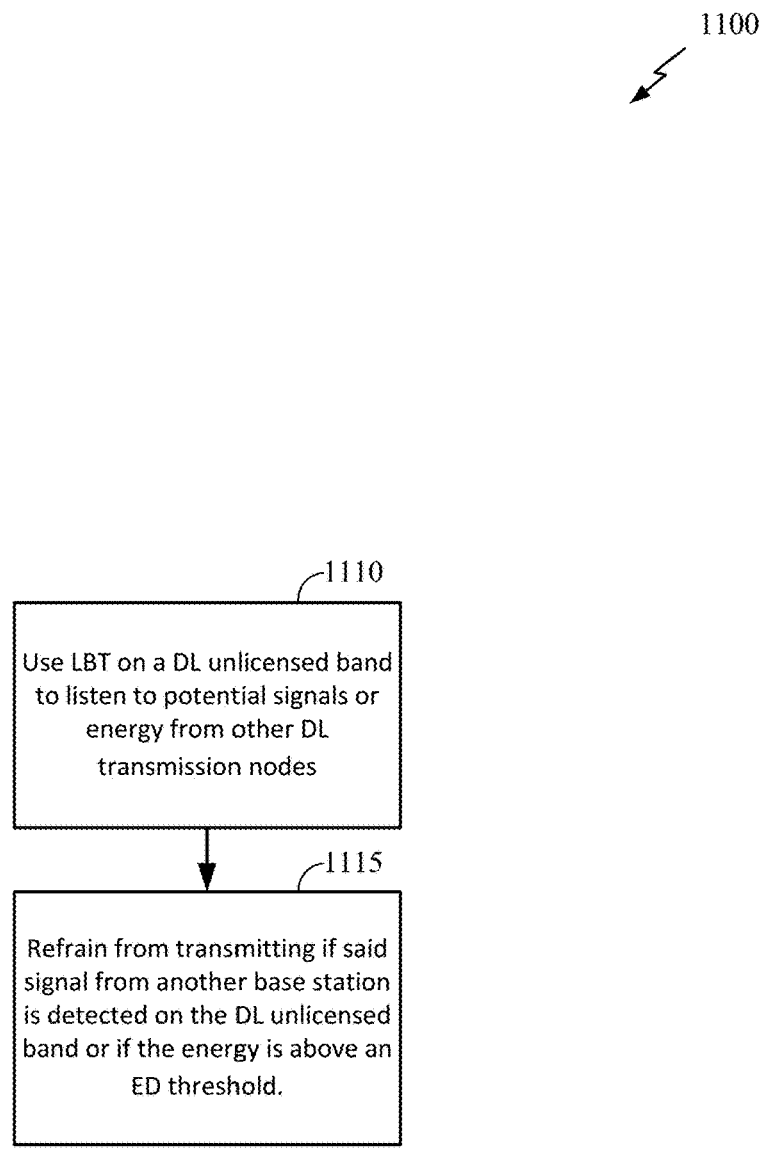
FIGS. 11-15 show flowcharts illustrating methods supporting LBT operation in unlicensed DL and licensed UL deployments in accordance with various aspects of the present disclosure.

FIG. 11 shows a flowchart illustrating a method 1100 supporting LBT operation in an unlicensed DL and licensed UL deployment in accordance with various aspects of the present disclosure. The operations of method 1100 may be implemented by a base station (e.g., a base station 110, 605, 705, 805, 905, 1105, etc.) or its components as described with reference to FIGS. 1-10 and 16. For example, operations of method 1100 may relate to similar aspects as described by FIGS. 6A, 6B, and 6C.

At 1110, a base station may use LBT on a DL unlicensed band to listen to (i.e., monitor for) potential signals or energy from other DL transmission nodes (e.g., base stations, UEs, or other unlicensed devices).

At 1115, the base station may refrain from transmitting (e.g., backoff for a specific or pseudorandom amount of time) if said signal from another transmission node is detected on the DL unlicensed band or if the energy is above an ED threshold.

Figure 12:
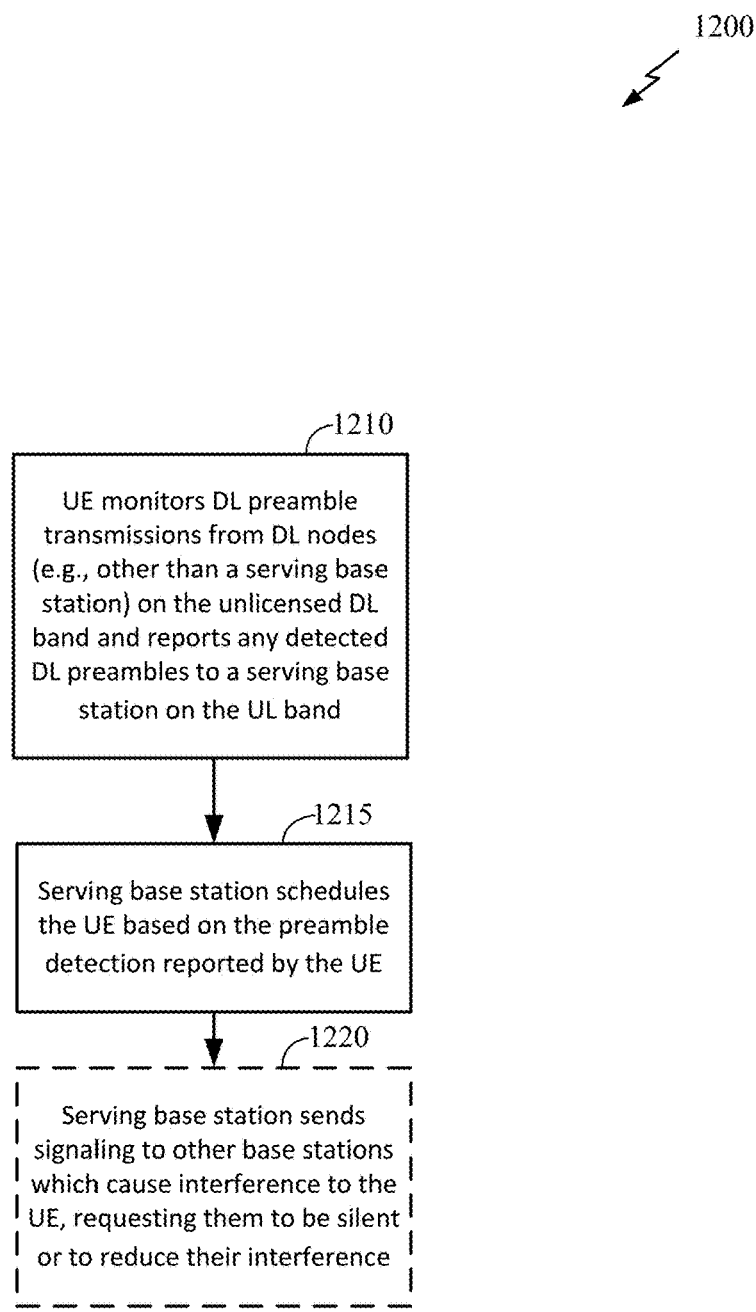

FIG. 12 shows a flowchart illustrating a method 1200 supporting LBT operation in an unlicensed DL and licensed UL deployment in accordance with various aspects of the present disclosure. Some operations of method 1200 may be implemented by a base station (e.g., a base station 110, 605, 705, 805, 905, 1105, etc.) or its components as described with reference to FIGS. 1-10 and 16. Other operations of method 1200 may be implemented by UE (e.g., a UE 120, 615, 715, 815, 915, 1015, etc.) or its components as described with references to FIGS. 1-10 and 17. For example, operations of method 1200 may relate to similar aspects as described by FIG. 7.

At 1210, the UE may monitor DL preamble transmissions (or other signals) from DL base stations on the unlicensed DL band and may report detected DL preambles (or other signals) to a serving base station on the UL band (e.g., a licensed UL band).

At 1215, the serving base station may schedule the UE based on the preamble detection (or other signal detection) reported by the UE.

In some cases, at 1220, the serving base station may send signaling (e.g., via a DL channel, an UL channel, an OTA interface, a backhaul link, etc.) to other base stations which cause interference to the UE, requesting the other base stations to be silent or reduce the interference. The serving base station may schedule the communications with the UE based on the other base stations backing off the unlicensed DL spectrum.

Figure 13:
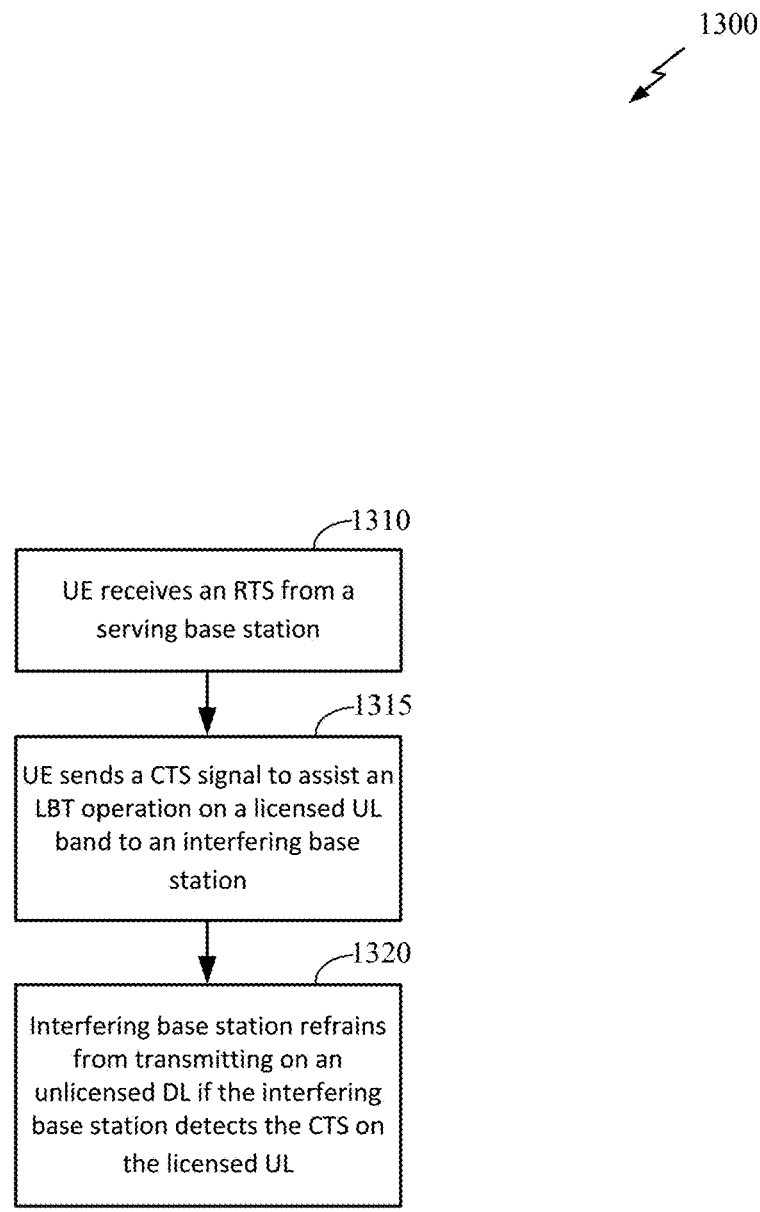

FIG. 13 shows a flowchart illustrating a method 1300 supporting LBT operation in an unlicensed DL and licensed UL deployment in accordance with various aspects of the present disclosure. Some operations of method 1300 may be implemented by a base station (e.g., a base station 110, 605, 705, 805, 905, 1105, etc.) or its components as described with reference to FIGS. 1-10 and 16. Other operations of method 1300 may be implemented by a UE (e.g., a UE 120, 615, 715, 815, 915, 1015, etc.) or its components as described with references to FIGS. 1-10 and 17. For example, operations of method 1300 may relate to similar aspects as described by FIG. 8.

At 1310, a UE may receive an RTS from a serving base station and may send a signal to assist an LBT operation to an interfering base station. For example, at 1315, the UE may send a CTS signal to assist the LBT operation on a licensed UL band to the interfering base station.

At 1320, the interfering base station may refrain from transmitting on an unlicensed DL band if the interfering base station detects the CTS on the licensed UL. For example, the interfering base station may determine that the CTS corresponds to the serving base station based on an implicit or explicit indication in the CTS. The CTS may also include an implicit or explicit indication of the unlicensed DL channel that the CTS corresponds to.

Figure 14:
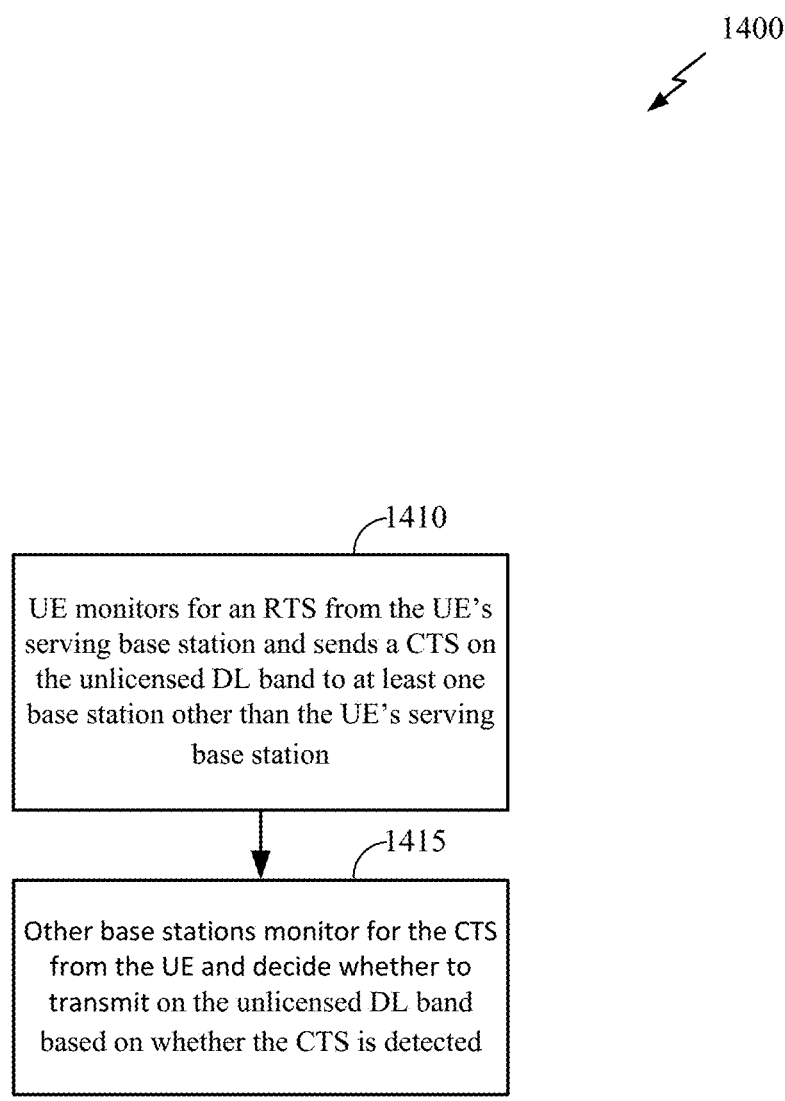

FIG. 14 shows a flowchart illustrating a method 1100 supporting LBT operation in an unlicensed DL and licensed UL deployment in accordance with various aspects of the present disclosure. Some operations of method 1300 may be implemented by a base station (e.g., a base station 110, 605, 705, 805, 905, 1105, etc.) or its components as described with reference to FIGS. 1-10 and 16. Other operations of method 1300 may be implemented by a UE (e.g., a UE 120, 615, 715, 815, 915, 1015, etc.) or its components as described with references to FIGS. 1-10 and 17. For example, operations of method 1400 may relate to similar aspects as described by FIG. 9A.

At 1410, a UE may monitor for an RTS from the UE's serving base station and may send a CTS on the unlicensed DL band to at least one base station other than the UE's serving base station.

At 1415, other base stations may listen to (e.g., monitor for) the CTS from the UE and decide whether to transmit on the unlicensed DL band based on whether a CTS is detected.

Figure 15:
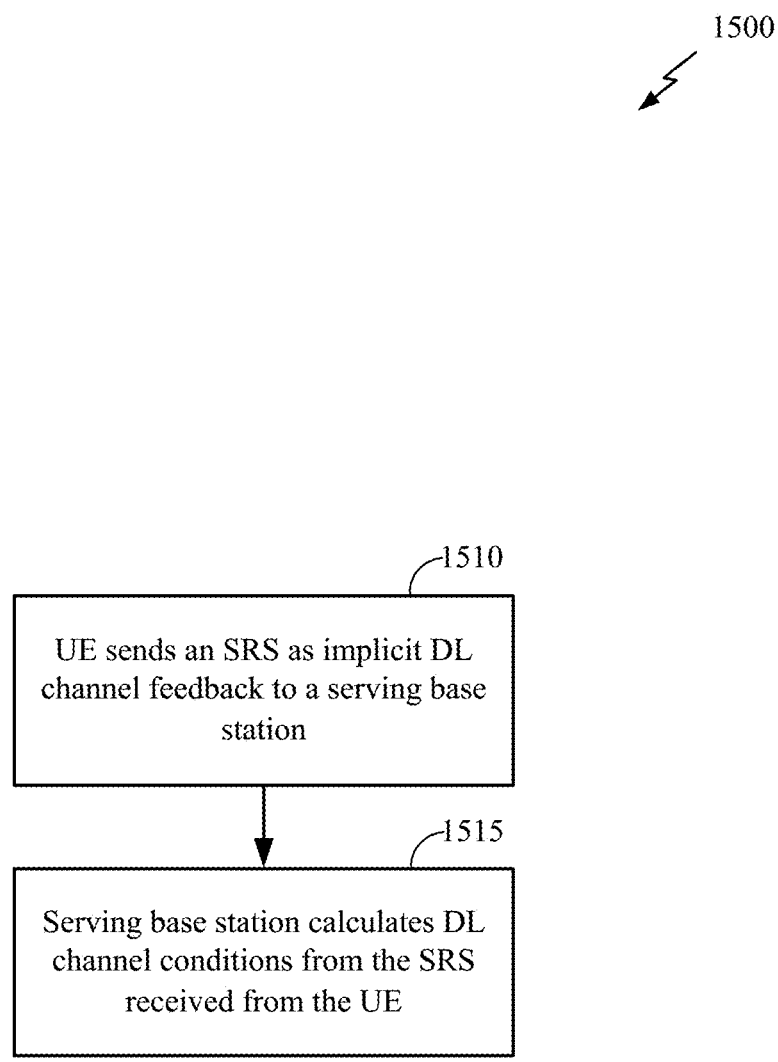

FIG. 15 shows a flowchart illustrating a method 1100 supporting LBT operation in an unlicensed DL and licensed UL deployment in accordance with various aspects of the present disclosure. Some operations of method 1300 may be implemented by a base station (e.g., a base station 110, 605, 705, 805, 905, 1105, etc.) or its components as described with reference to FIGS. 1-10 and 16. Other operations of method 1300 may be implemented by a UE (e.g., a UE 120, 615, 715, 815, 915, 1015, etc.) or its components as described with references to FIGS. 1-10 and 17. For example, operations of method 1500 may relate to similar aspects as described by FIG. 10.

At 1510, a UE may send an SRS as implicit channel feedback to a serving base station. For example, the UE may transmit the SRS on an unlicensed DL channel. At 1515, the serving base station may calculate DL channel conditions (e.g., for the unlicensed DL channel) from the SRS received from the UE.

Figure 16:
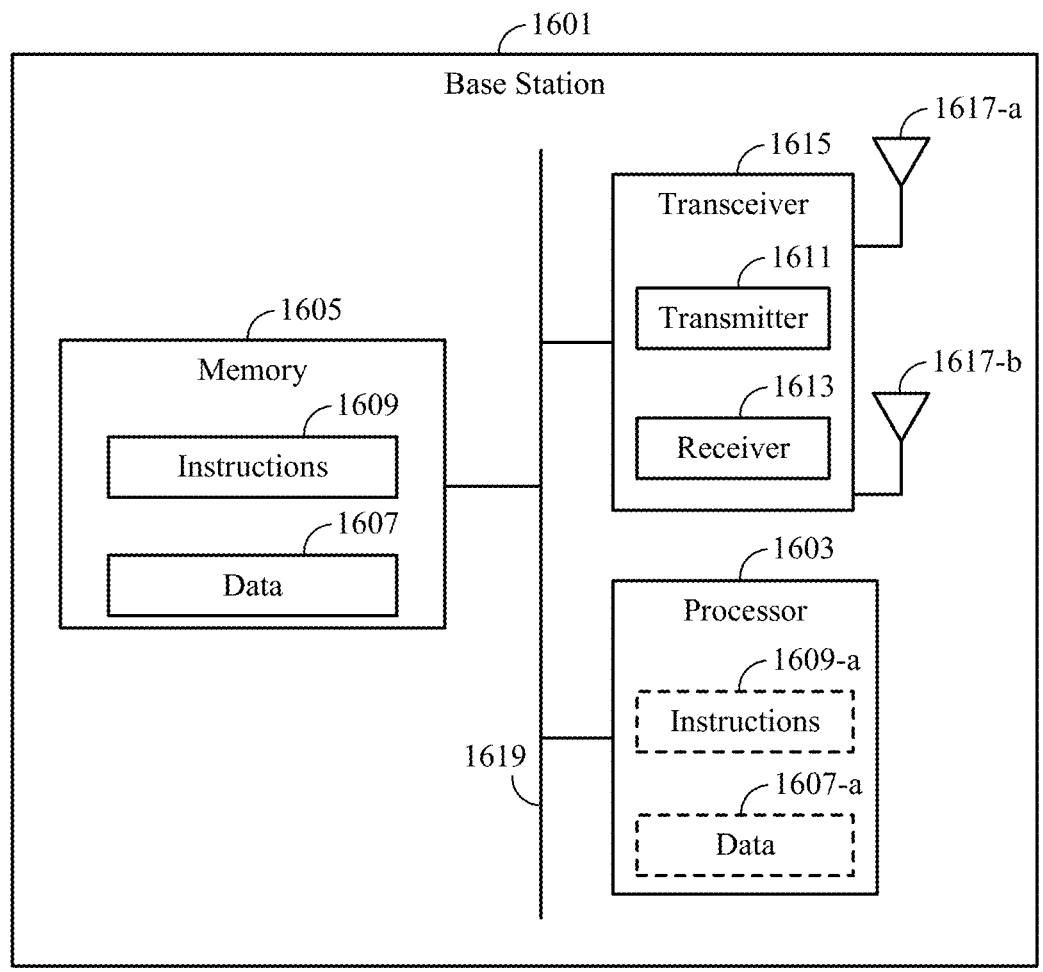
FIG. 16 illustrates a system including a base station that supports LBT operation in an unlicensed DL and licensed UL deployment in accordance with various aspects of the present disclosure.

FIG. 16 illustrates a system including a base station 1601 (e.g., a base station 110, 605, 705, 805, 905, 1105, etc.) that supports LBT operation in an unlicensed DL and licensed UL deployment in accordance with various aspects of the present disclosure. The base station 1601 may be an access point, a NodeB, an evolved NodeB, etc. The base station 1601 may include a processor 1603. The processor 1603 may be a general purpose single-chip or multi-chip microprocessor (e.g., an advanced reduced instruction set computer (RISC) architecture (ARM)), a special purpose microprocessor (e.g., a digital signal processor (DSP)), a microcontroller, a programmable gate array, etc. The processor 1603 may be referred to as a central processing unit (CPU). Although just a single processor 1603 is shown in the base station 1601 of FIG. 16, in an alternative configuration, a combination of processors (e.g., an ARM and DSP) may be used.

The base station 1601 may also include memory 1605. The memory 1605 may be any electronic component capable of storing electronic information. The memory 1605 may be embodied as random-access memory (RAM), read-only memory (ROM), magnetic disk storage media, optical storage media, flash memory devices in RAM, on-board memory included with the processor, erasable programmable read-only memory (EPROM), electronically erasable programmable read-only memory (EEPROM), registers, and so forth, including combinations thereof.

Data 1607 and instructions 1609 may be stored in the memory 1605. The instructions 1609 may be executable by the processor 1603 to implement the methods disclosed herein. Executing the instructions 1609 may involve the use of the data 1607 that is stored in the memory 1605. When the processor 1603 executes the instructions 1609, various portions of the instructions 1609-a may be loaded onto the processor 1603, and various pieces of data 1607-a may be loaded onto the processor 1603.

The base station 1601 may also include a transmitter 1611 and a receiver 1613 to allow transmission and reception of signals to and from the wireless device 1601. The transmitter 1611 and receiver 1613 may be collectively referred to as a transceiver 1615. Multiple antennas, such as antennas 1617-a and 1617-b, may be electrically coupled to the transceiver 1615. The base station 1601 may also include (not shown) multiple transmitters, multiple receivers and/or multiple transceivers.

The various components of the base station 1601 may be coupled together by one or more buses, which may include a power bus, a control signal bus, a status signal bus, a data bus, etc. For the sake of clarity, the various buses are illustrated in FIG. 16 as a bus system 1619. Although some operations or functions described herein were discussed with reference to a UE, it should be understood that a base station, such as base station 1601, may perform the corresponding transmitting that is received and monitored by the UE as well as the receiving of the information indicated by the UE discussed in FIGS. 6-15 and may be implemented in hardware, software executed by a processor like the processor 1603 described in FIG. 16, or both. Some or all of the functions described herein in the flowcharts of FIGS. 11-15 may be implemented in hardware, software executed by a processor like the processor 1603 described in FIG. 16, or a combination thereof by a base station 1601.

The system as described by FIG. 16 may allow a base station 1601 to receive, from a UE on a licensed UL carrier (e.g., a licensed UL spectrum, licensed UL band, etc.) a signal to assist with an LBT operation for an unlicensed DL carrier (e.g., an unlicensed DL spectrum, unlicensed DL band, etc.) and perform the LBT operation for the unlicensed DL carrier, where the performing the LBT operation includes modifying the LBT operation for the unlicensed DL carrier based on receiving the signal to assist with the LBT operation. Additionally or alternatively, the base station 1601 may receive, from a UE, reporting of a signal (e.g., at least one preamble, a channel reservation signal, an energy level greater than a clear channel energy threshold for the unlicensed DL carrier, etc.) detected by the UE on an unlicensed DL carrier and schedule a transmission to the UE on the unlicensed DL carrier based on the reporting of the signal detected by the UE.

Figure 17:
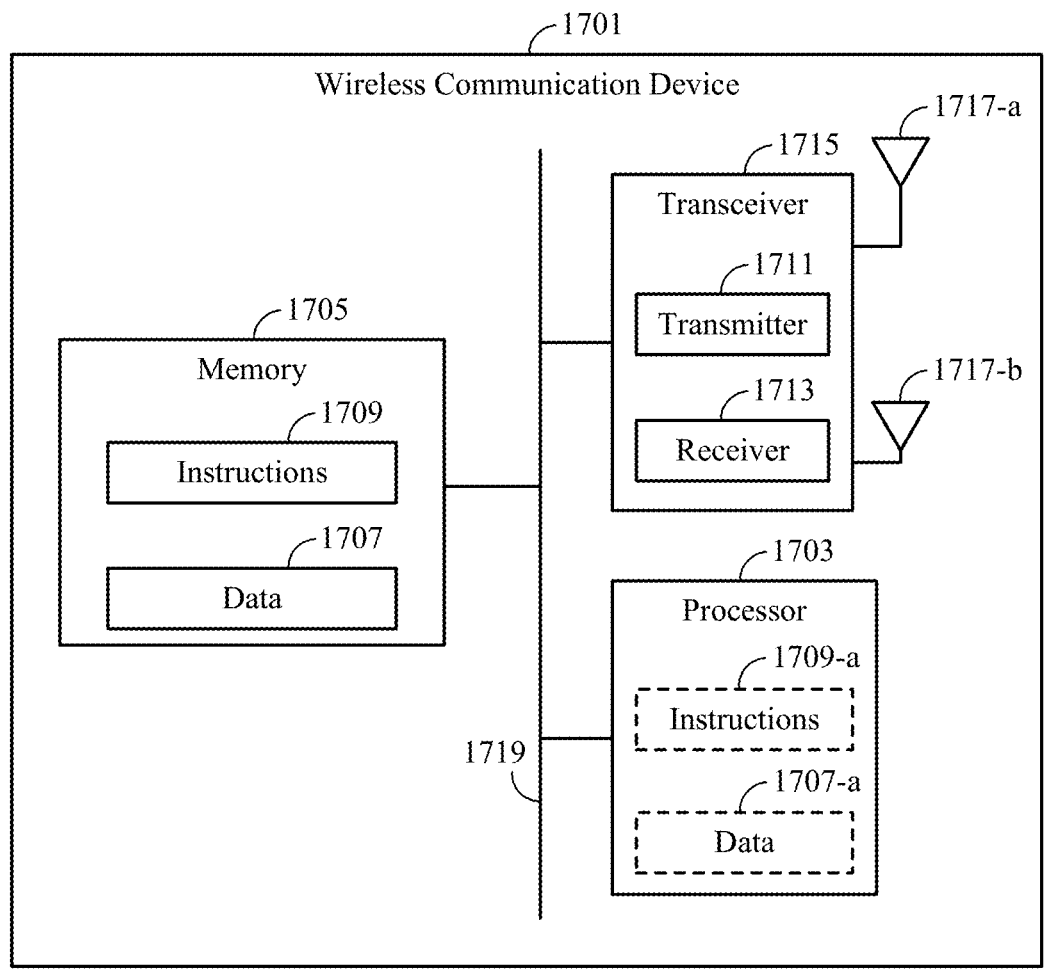
FIG. 17 illustrates a system including a wireless communication device that supports LBT operation in an unlicensed DL and licensed UL deployment in accordance with various aspects of the present disclosure.

FIG. 17 illustrates a system including a wireless communication device 1701 (e.g., a UE 120, 615, 715, 815, 915, 1015, etc.) that supports LBT operation in an unlicensed DL and licensed UL deployment in accordance with various aspects of the present disclosure. The wireless communication device 1701 may be an access terminal, a mobile station, a UE, etc. The wireless communication device 1701 includes a processor 1703. The processor 1703 may be a general-purpose single-chip or multi-chip microprocessor (e.g., an ARM), a special purpose microprocessor (e.g., a DSP), a microcontroller, a programmable gate array, etc. The processor 1703 may be referred to as a CPU. Although just a single processor 1703 is shown in the wireless communication device 1701 of FIG. 17, in an alternative configuration, a combination of processors (e.g., an ARM and DSP) may be used.

The wireless communication device 1701 also includes memory 1705. The memory 1705 may be any electronic component capable of storing electronic information. The memory 1705 may be embodied as RAM, ROM, magnetic disk storage media, optical storage media, flash memory devices in RAM, on-board memory included with the processor, EPROM, EEPROM, registers, and so forth, including combinations thereof.

Data 1707 and instructions 1709 may be stored in the memory 1705. The instructions 1709 may be executable by the processor 1703 to implement the methods disclosed herein. Executing the instructions 1709 may involve the use of the data 1707 that is stored in the memory 1705. When the processor 1703 executes the instructions 1709, various portions of the instructions 1709-a may be loaded onto the processor 1703, and various pieces of data 1707-a may be loaded onto the processor 1703.

The wireless communication device 1701 may also include a transmitter 1711 and a receiver 1713 to allow transmission and reception of signals to and from the wireless communication device 1701. The transmitter 1711 and receiver 1713 may be collectively referred to as a transceiver 1715. Multiple antennas, such as antennas 1717-a and 1717-b, may be electrically coupled to the transceiver 1715. The wireless communication device 1701 may also include (not shown) multiple transmitters, multiple receivers and/or multiple transceivers.

The various components of the wireless communication device 1701 may be coupled together by one or more buses, which may include a power bus, a control signal bus, a status signal bus, a data bus, etc. For the sake of clarity, the various buses are illustrated in FIG. 17 as a bus system 1719. It should be noted that these methods describe possible implementations, and that the operations and the steps may be rearranged or otherwise modified such that other implementations are possible. In some cases, aspects from two or more of the methods may be combined. For example, aspects of each of the methods may include steps or aspects of the other methods, or other steps or techniques described herein. Thus, aspects of the disclosure may provide for receiving on transmit and transmitting on receive. Although some operations or functions described herein were discussed with reference to a base station, it should be understood that a UE, such as wireless communication device 1701, may perform the corresponding transmitting that is received and monitored by the base station as well as the receiving of the information indicated by the base station discussed in FIGS. 1-15 and may be implemented in hardware, software executed by a processor like the processor 1703 described in FIG. 17, or both. The functions described herein in the flowcharts of FIGS. 11-15 may be implemented in hardware, software executed by a processor like the processor 1703 described in FIG. 17, or a combination thereof by a wireless communication device 1701.

The system as described by FIG. 17 may allow a wireless communication device 1701 (e.g., a UE) to receive, from a base station on an unlicensed DL carrier (e.g., an unlicensed DL spectrum, unlicensed DL band, etc.), an RTS signal for the unlicensed DL carrier and transmit, to the base station on a licensed UL carrier, a signal to assist the base station with an LBT operation for the unlicensed DL carrier. Additionally or alternatively, the wireless communication device 1701 (e.g., the UE) may receive, from a first base station on an unlicensed DL carrier, an RTS signal, detect, from a second base station on the unlicensed DL carrier, a signal (e.g., a DL preamble, a channel reservation signal, an energy level greater than a clear channel energy threshold for the unlicensed DL carrier, etc.), report, to the first base station, the detected signal, and receive, from the first base station on the unlicensed DL carrier, a DL transmission according to scheduling based on the reporting of the detected signal.

The description herein is provided to enable a person skilled in the art to make or use the disclosure. Various modifications to the disclosure may be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other aspects and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may include RAM, ROM, EEPROM, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc, where disks usually reproduce data magnetically, while discs reproduce data optically with lasers. Combinations of the above are also included within the scope of computer-readable media.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term eNB may be generally used to describe the base stations. The wireless communications system or systems described herein may include a heterogeneous LTE/LTE-A network in which different types of base stations provide coverage for various geographical regions. For example, each base station or base station may provide communication coverage for a macro cell, a small cell, or other types of cell. The term "cell" is a 3GPP term that may be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNB, Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 of FIG. 1 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein may transmit bidirectional communications using frequency division duplex (FDD) operation (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Aspects of the disclosure may provide for receiving on transmit and transmitting on receive. It should be noted that these methods describe possible implementations, and that the operations and the steps may be rearranged or otherwise modified such that other implementations are possible. In some aspects, aspects from two or more of the methods may be combined.

The various illustrative blocks and modules described in connection with the disclosure herein may be implemented or performed with a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various aspects, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method for gaining access to a channel of a shared spectrum implemented by a user equipment (UE), comprising:
   receiving, from a first base station on an unlicensed downlink carrier, a request to send (RTS) signal for a downlink transmission;
   detecting a signal on the unlicensed downlink carrier, wherein the detected signal comprises a preamble of a channel reservation (CR) signal from a second base station;
   reporting, to the first base station on a licensed uplink carrier, a preamble detection report indicating the preamble of the detected signal; and
   receiving, from the first base station on the unlicensed downlink carrier, the downlink transmission according to scheduling based at least in part on the preamble detection report.

2. The method of claim 1, further comprising:
   monitoring the unlicensed downlink carrier based at least in part on the receiving the RTS signal, wherein the detecting is based at least in part on the monitoring.

3. The method of claim 1, further comprising:
   detecting a network allocation vector (NAV) associated with the detected signal; and
   reporting the NAV with the detected signal.

4. The method of claim 1, wherein the reporting indicates a signal strength associated with the detected signal, a signal duration associated with the detected signal, or a combination thereof.

5. The method of claim 1, wherein receiving the downlink transmission according to the scheduling based at least in part on the preamble detection report comprises:
   receiving the downlink transmission according to the scheduling further based at least in part on the received RTS signal.

6. The method of claim 1, further comprising:
   detecting a reduction in a magnitude of interference from the second base station, wherein the downlink transmission is received according to the scheduling further based at least in part on the reduction in the magnitude of the interference.

7. A user equipment (UE), comprising:
   a memory; and
   a processor, coupled with the memory, the processor configured to:
      receive, from a first base station on an unlicensed downlink carrier, a request to send (RTS) signal for a downlink transmission;
      detect a signal on the unlicensed downlink carrier, wherein the detected signal comprises a preamble of a channel reservation (CR) signal from a second base station;
      report, to the first base station on a licensed uplink carrier, a preamble detection report indicating the preamble of the detected signal; and
      receive, from the first base station on the unlicensed downlink carrier, the downlink transmission according to scheduling based at least in part on the preamble detection report.

8. The UE of claim 7, wherein the processor is further configured to:
   monitor the unlicensed downlink carrier based at least in part on the receiving the RTS signal, wherein the detecting is based at least in part on the monitoring.

9. The UE of claim 7, wherein the processor is further configured to:
   detect a network allocation vector (NAV) associated with the detected signal; and
   report the NAV with the detected signal.

10. The UE of claim 7, wherein the reporting indicates a signal strength associated with the detected signal, a signal duration associated with the detected signal, or a combination thereof.

11. The UE of claim 7, wherein the processor configured to receive the downlink transmission according to the scheduling based at least in part on the preamble detection report is further configured to:
   receive the downlink transmission according to the scheduling further based at least in part on the received RTS signal.

12. The UE of claim 7, wherein the processor is further configured to:
   detect a reduction in a magnitude of interference from the second base station, wherein the downlink transmission is received according to the scheduling further based at least in part on the reduction in the magnitude of the interference.

13. An apparatus for gaining access to a channel of a shared spectrum, comprising:
   means for receiving, from a first base station on an unlicensed downlink carrier, a request to send (RTS) signal for a downlink transmission;
   means for detecting a signal on the unlicensed downlink carrier, wherein the detected signal comprises a preamble of a channel reservation (CR) signal from a second base station;
   means for reporting, to the first base station on a licensed uplink carrier, a preamble detection report indicating the preamble of the detected signal; and
   means for receiving, from the first base station on the unlicensed downlink carrier, the downlink transmission according to scheduling based at least in part on the preamble detection report.

14. The apparatus of claim 13, further comprising:
   means for monitoring the unlicensed downlink carrier based at least in part on the receiving the RTS signal, wherein the detecting is based at least in part on the monitoring.

15. The apparatus of claim 13, further comprising:
   means for detecting a network allocation vector (NAV) associated with the detected signal; and
   means for reporting the NAV with the detected signal.

16. The apparatus of claim 13, wherein the reporting indicates a signal strength associated with the detected signal, a signal duration associated with the detected signal, or a combination thereof.

17. The apparatus of claim 13, wherein the means for receiving the downlink transmission according to the scheduling based at least in part on the preamble detection report comprise:
   means for receiving the downlink transmission according to the scheduling further based at least in part on the received RTS signal.

18. The apparatus of claim 13, further comprising:
   means for detecting a reduction in a magnitude of interference from the second base station, wherein the downlink transmission is received according to the scheduling further based at least in part on the reduction in the magnitude of the interference.

\* \* \* \* \*